(12) United States Patent
Miyamae

(10) Patent No.: US 9,246,387 B2
(45) Date of Patent: Jan. 26, 2016

(54) OUTPUT VOLTAGE CONTROLLER, ELECTRONIC DEVICE, AND OUTPUT VOLTAGE CONTROL METHOD

(71) Applicant: Spansion LLC, Sunnyvale, CA (US)

(72) Inventor: Toru Miyamae, Kasugai (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/107,729

(22) Filed: Dec. 16, 2013

(65) Prior Publication Data

US 2014/0097820 A1    Apr. 10, 2014

Related U.S. Application Data

(63) Continuation of application No. 12/605,115, filed on Oct. 23, 2009, now Pat. No. 8,618,781.

(30) Foreign Application Priority Data

Dec. 2, 2008  (JP) ................................ 2008-307775
Jul. 27, 2009  (JP) ................................ 2009-174625

(51) Int. Cl.
*G05F 1/40* (2006.01)
*H02M 3/158* (2006.01)
*H02M 3/157* (2006.01)
*G05F 1/44* (2006.01)
*G05F 1/56* (2006.01)
*H02M 1/00* (2007.01)

(52) U.S. Cl.
CPC .............. *H02M 3/158* (2013.01); *H02M 3/157* (2013.01); *G05F 1/44* (2013.01); *G05F 1/56* (2013.01); *H02M 2001/0009* (2013.01); *H02M 2001/0022* (2013.01)

(58) Field of Classification Search
CPC .................................. G05F 1/44; G05F 1/565
USPC .................. 323/222, 225, 268, 271, 282–285
See application file for complete search history.

(56) References Cited

U.S. PATENT DOCUMENTS

| | | | |
|---|---|---|---|
| 4,967,138 A * | 10/1990 | Obergfell et al. ............. | 323/224 |
| 6,747,441 B2 | 6/2004 | Johnson et al. | |
| 6,788,033 B2 | 9/2004 | Vinciarelli | |
| 7,116,085 B2 | 10/2006 | Ikezawa | |
| 7,408,328 B2 | 8/2008 | Johnson et al. | |

(Continued)

FOREIGN PATENT DOCUMENTS

| | | |
|---|---|---|
| JP | 2000-060115 A | 2/2000 |
| JP | 2002-233138 A | 8/2002 |

(Continued)

OTHER PUBLICATIONS

Chinese Office Action from CN App. No. 2009-10225227.5 dated Mar. 1, 2012.

(Continued)

*Primary Examiner* — Matthew Nguyen

(57) ABSTRACT

An output voltage controller includes a first controller which controls current supply to a inductor based on an output voltage, and a second controller which controls current supply to the inductor by controlling a period when an input end to which an input voltage is inputted, the inductor, and an output end from which the output voltage is outputted are coupled based on the input voltage.

18 Claims, 24 Drawing Sheets

(56) References Cited

U.S. PATENT DOCUMENTS

| | | |
|---|---|---|
| 7,652,945 B2 * | 1/2010 | Chu et al. .................. 365/226 |
| 7,733,072 B2 | 6/2010 | Kanakubo |
| 8,106,634 B2 | 1/2012 | Hojo et al. |
| 2005/0206354 A1 | 9/2005 | Ikezawa |
| 2011/0018513 A1 * | 1/2011 | Noda ........................ 323/282 |
| 2011/0175582 A1 * | 7/2011 | Latham et al. ............. 323/271 |
| 2013/0207629 A1 * | 8/2013 | Engelhardt ................ 323/282 |

FOREIGN PATENT DOCUMENTS

| | | |
|---|---|---|
| JP | 2005-117828 A | 4/2005 |
| JP | 2005-192312 A | 7/2005 |
| JP | 2006-033974 A | 2/2006 |
| JP | 2006-094690 A | 4/2006 |
| JP | 2008-92779 A | 4/2008 |
| JP | 2008-131747 A | 6/2008 |
| JP | 2008-182839 A | 8/2008 |

OTHER PUBLICATIONS

Notification of Reasons for Refusal, dated Jun. 16, 2013, 8 pages.
English language abstract for Japanese patent publication No. 2005-117828 A.
English language abstract for Japanese patent publication No. 2008-92779 A.
USPTO Non-Final Rejection for U.S. Appl. No. 12/605,115 dated Oct. 23, 2012; 5 pages.
USPTO Notice of Allowance for U.S. Appl. No. 12/605,115 dated Apr. 2, 2013; 6 pages.
USPTO Notice of Allowance for U.S. Appl. No. 12/605,115 dated Aug. 30, 2013; 8 pages.
USPTO Notice of Allowance for U.S. Appl. No. 12/605,115 dated Oct. 29, 2013; 2 pages.

* cited by examiner

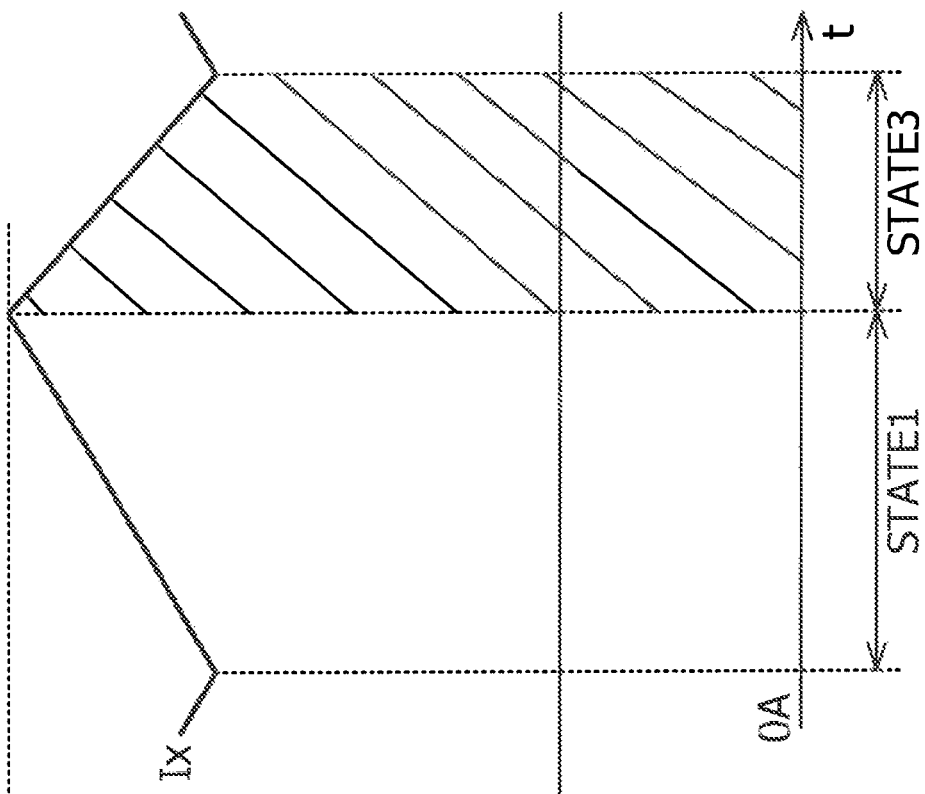
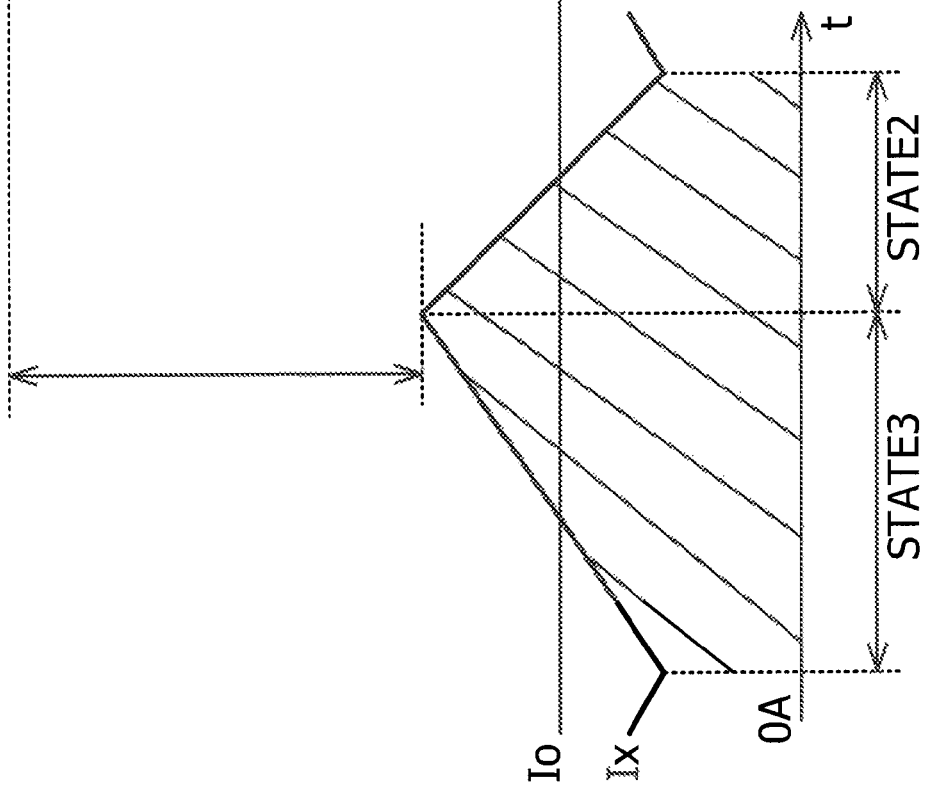

OUTPUT VOLTAGE CONTROLLER, ELECTRONIC DEVICE, AND OUTPUT VOLTAGE CONTROL METHOD

CROSS REFERENCE TO RELATED APPLICATIONS

This application is a continuation of U.S. application Ser. No. 12/605,115, which is herein incorporated by reference in its entirety.

BACKGROUND OF THE INVENTION

1. Field of the Invention

The present application relates to an output voltage controller which steps-up or steps-down an input voltage and outputs a voltage.

2. Background Art

A DC/DC converter has been put to practical use as an output voltage controller which outputs a constant voltage based on supply of a DC input voltage. A DC/DC converter is a small, lightweight, high-efficiency DC power supply which uses a semiconductor switching element and is widely used in an electronic device.

The basic functions of a DC/DC converter are to turn on and off a switching element at high frequencies, variably control the ratio between on-time and off-time (i.e., a duty ratio), and maintain a DC output voltage at a constant voltage. There are three types of DC/DC converters: a step-up type by which an output voltage higher than an input voltage is obtained; a step-down type by which an output voltage lower than an input voltage is obtained; and a step-down-step-up type by which a constant output voltage is obtained regardless of an input voltage.

A step-down-step-up DC/DC converter has a choke inductor coupled in series or in parallel with a voltage output terminal, and alternates between a state in which energy is stored from the input side in the choke inductor by on-off action of a switching element, and a state in which energy is released from the choke inductor to the output side.

A step-down-step-up DC/DC converter suffers from a larger power loss through switching operations than step-up and step-down types and is thus preferably used when an input voltage and an output voltage are close to each other. In practice, when an output voltage of 3 V is to be outputted, a step-down-step-up DC/DC converter is controlled to operate in a step-down mode when an input voltage supplied from a battery is more than 4 V, operate in a step-down-step-up mode when that the input voltage is more than 2.8 V and not more than 4 V, and operate in a step-up mode when the input voltage is not more than 2.8 V.

Note that an H bridge step-down-step-up DC/DC converter which performs step-down-step-up operation by switching among four states, including state 1 to state 4, is known (see, e.g., Japanese Patent Laid-Open No. 2005-192312).

In a conventional DC/DC converter, the number of switching operations increases with an increase in the number of states in which the DC/DC converter is made to operate. This increases a power loss and reduces the efficiency.

BRIEF SUMMARY OF THE INVENTION

According to an aspect of the apparatus described herein, an output voltage controller includes a first controller that controls current supply to an inductor based on an output voltage, and a second controller which controls current supply to the inductor by controlling a period when an input end to which an input voltage is inputted, the inductor, and an output end from which the output voltage is outputted are coupled based on the input voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS/FIGURES

FIGS. 20A and 20B illustrate the relationship between load current and inductor current;

DETAILED DESCRIPTION OF THE INVENTION

Figure 1:
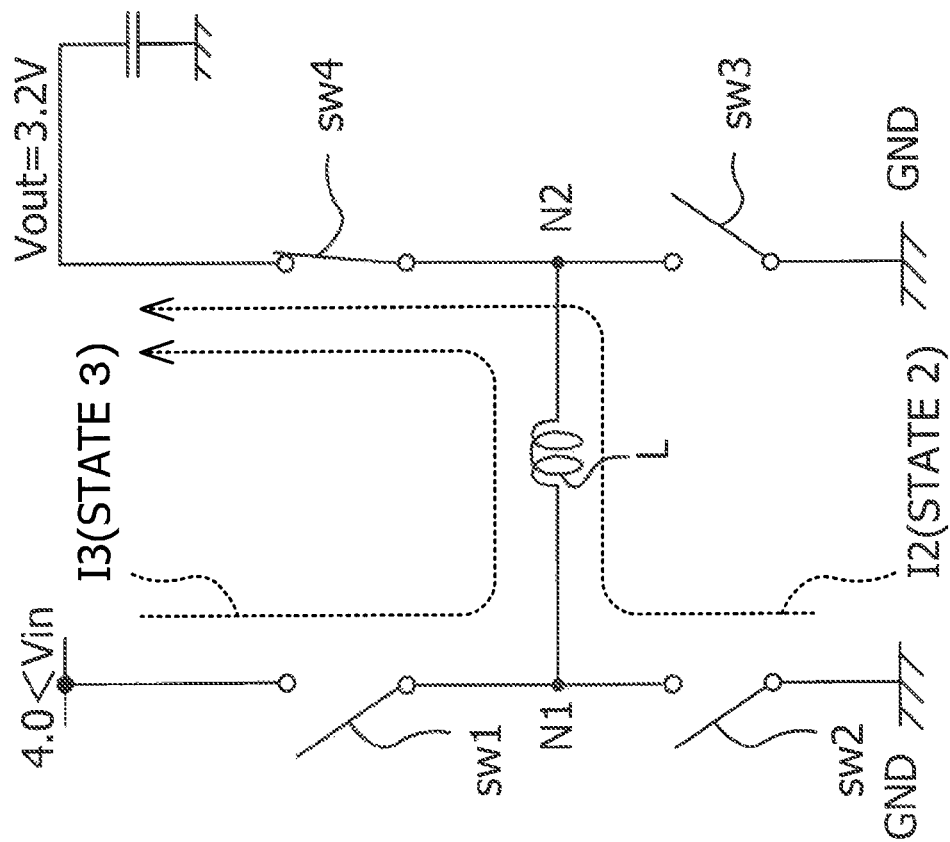
FIG. 1 illustrates an operation of an output section of a step-down-step-up DC/DC converter.
Figure 2:
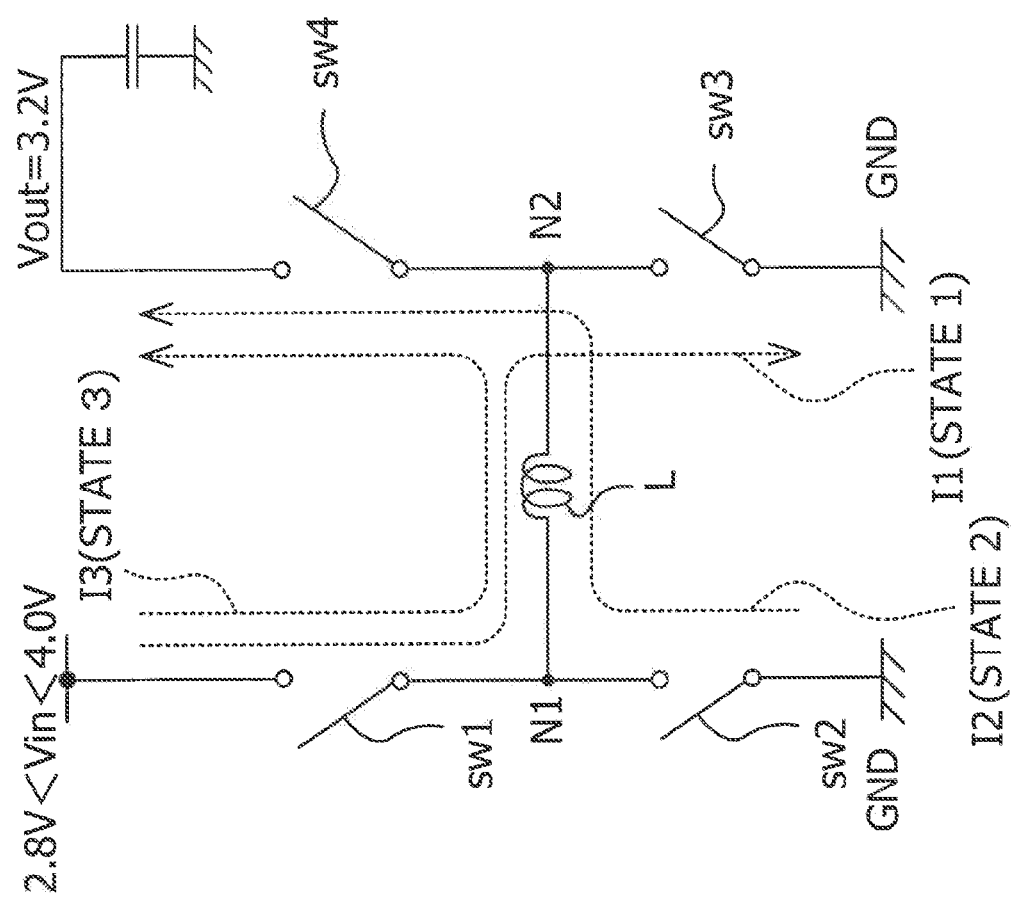
FIG. 2 illustrates an operation of the output section of the step-down-step-up DC/DC converter.
Figure 3:
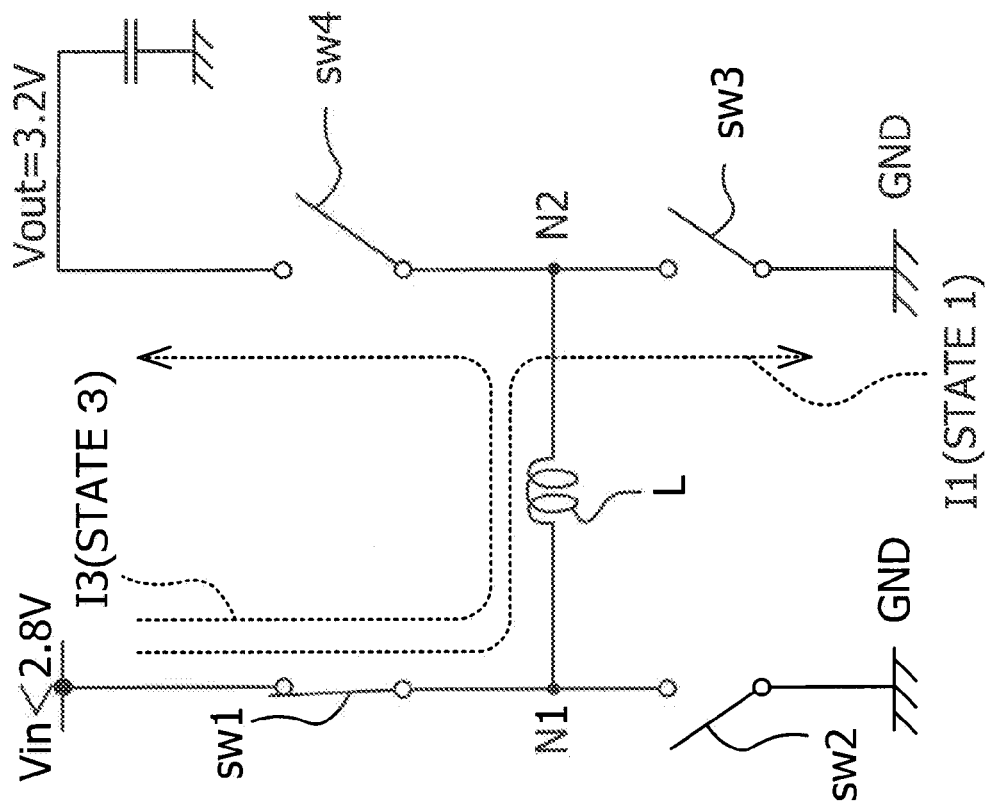
FIG. 3 illustrates an operation of the output section of the step-down-step-up DC/DC converter.

FIGS. 1 to 3 illustrate an output section of an H bridge step-down-step-up DC/DC converter. The output section includes switch circuits sw1 to sw4 and a choke inductor L. An input voltage Vin is supplied to a node N1 which serves as one end of the choke inductor L through the switch circuit sw1. The node N1 is coupled to a ground GND through the switch circuit sw2.

A node N2 which serves as the other end of the choke inductor L is coupled to the ground GND through the switch circuit sw3 and outputs an output voltage Vout through the switch circuit sw4.

The operation of the above-described output section in three states, a step-down-step-up mode, a step-up mode, and a step-down mode, will be described. Assume that when the output voltage Vout is set to 3.2 V, the output section is, for example, controlled to operate in the step-down mode, when the input voltage Vin is not less than 4.0 V, operate in the step-down-step-up mode when the input voltage Vin satisfies 2.8 V<Vin<4 V, and operate in the step-up mode when the input voltage Vin is not more than 2.8 V.

In the step-down-step-up mode, each of the switch circuits sw1 to sw4 is open/close controlled such that the output section is sequentially placed in states 1 to 3, as illustrated in FIG. 2. First, in state 1, the switch circuits sw1 and sw3 are turned on, and the switch circuits sw2 and sw4 are turned off. A current I1 flows, and energy is accumulated in the choke inductor L.

In state 2, the switch circuits sw2 and sw4 are turned on, and the switch circuits sw1 and sw3 are turned off. A current I2 flows, and the energy accumulated in the choke inductor L is released.

In state 3, the switch circuits sw1 and sw4 are turned on, and the switch circuits sw2 and sw3 are turned off. A current I3 flows. The cycle is repeated. Step-down-step-up operation is performed by controlling duties in each of states 1 to 3.

In the step-down mode, the switch circuits sw1 and sw2 are alternately turned on, the switch circuit sw4 is fixed to ON, and the switch circuit sw3 is fixed to OFF, as illustrated in FIG. 1. That is, state 2 and state 3 alternate. The currents I2 and I3 flow alternately to step-down the output voltage Vout.

In the step-up mode, the switch circuits sw3 and sw4 are alternately turned on, the switch circuit sw1 is fixed to ON, and the switch circuit sw2 is fixed to OFF, as illustrated in FIG. 3. That is, state 1 and state 3 alternate. The currents I1 and I3 flow alternately to step-up the output voltage Vout. In each mode, the output voltage Vout is maintained at 3.2 V by controlling duties in the switch circuits to be switching-controlled.

In the H bridge step-down-step-up DC/DC converter, which operates in the above-described manner, two of the switch circuits sw1 to sw4 are switched in the step-down mode and in the step-up mode. Accordingly, the power efficiency becomes higher than a case where the four switch circuits are switching-controlled.

On the other hand, since the switch circuits, sw1 to sw4, are all switching-controlled in the step-down-step-up mode, the power efficiency is low. Energy accumulated in the choke inductor L in state 1 is released with little contribution to the output voltage Vout in state 2, which makes the power efficiency lower.

For this reason, when the H bridge step-down-step-up DC/DC converter is made to continuously shift from the step-up mode to the step-down mode or from the step-down mode to the step-up mode without a step-down-step-up mode occurring therebetween, the power efficiency may be improved.

Letting T be the clock period of the DC/DC converter and t2 be the time for state 2, the ratio of the output voltage Vout to the input voltage Vin in the above-described step-down mode is represented by formula (1):

$$\frac{Vout}{Vin} = \frac{T - t_2}{T} \quad (1)$$

Letting T be the clock period of the DC/DC converter and t1 be the time for state 1, the ratio of the output voltage Vout to the input voltage Vin in the above-described step-up mode is represented by formula (2):

$$\frac{Vout}{Vin} = \frac{T}{T - t_1} \quad (2)$$

When t2 and t1 are brought closer to 0 in formulae (1) and (2) described above, the input voltage Vin and the output voltage Vout become equal to each other. That is, when control may be performed such that the durations for state 2 and state 1 are minimized, the input voltage Vin and the output voltage Vout may be controlled to become almost equal to each other. This eliminates the need for the step-down-step-up mode.

In order to prevent degradation in the power efficiency in the step-down-step-up mode as described above, the time for state 2 is controlled to be minimized in the step-down mode, and the time for state 1 is controlled to be minimized in the step-up mode. With the above-described configuration, an H bridge step-down-step-up DC/DC converter which continuously shifts from the step-up mode to the step-down mode or from the step-down mode to the step-up mode without the step-down-step-up mode therebetween is implemented. Embodiments of such an H bridge step-down-step-up DC/DC converter will be described below.

Figure 4:
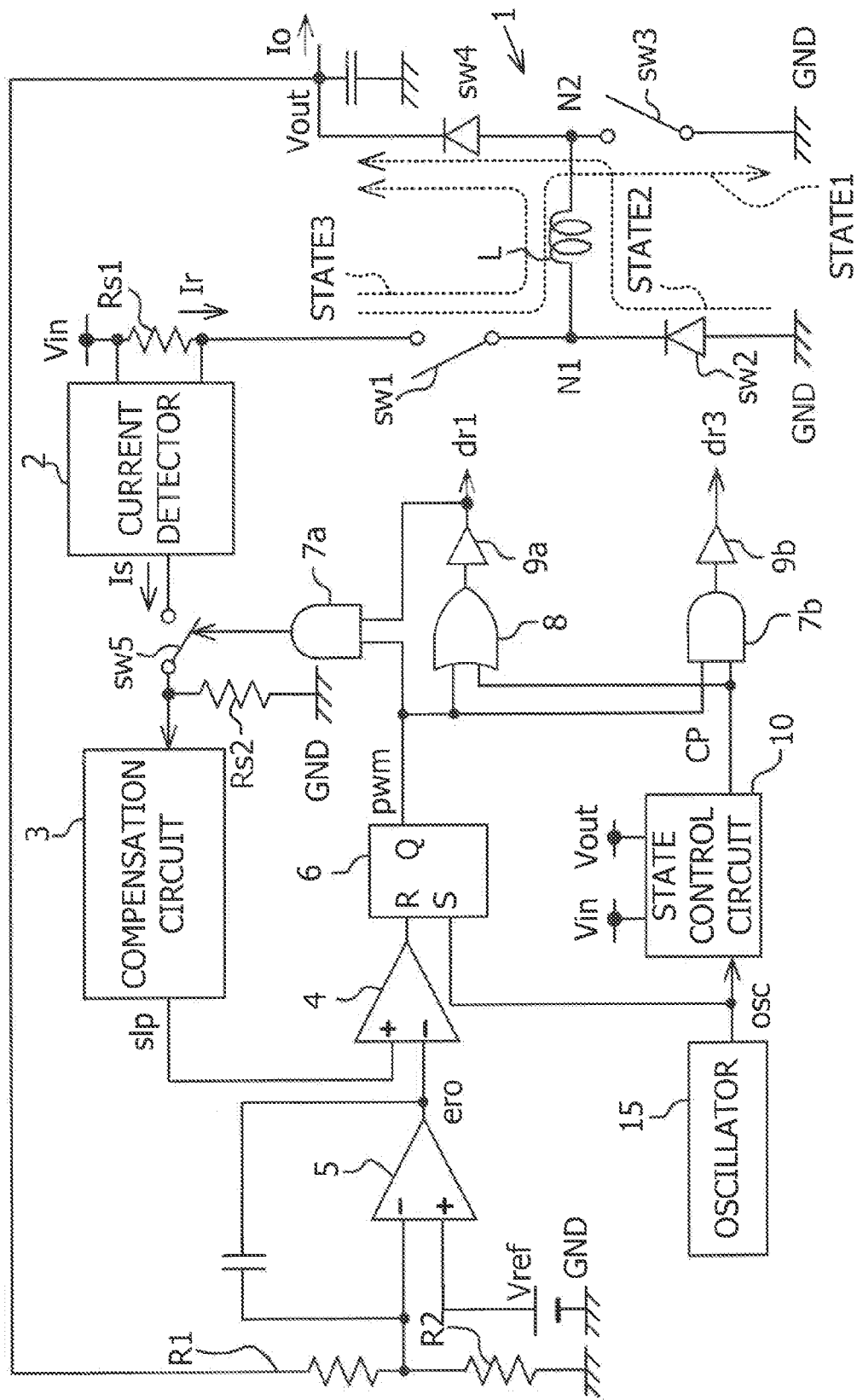
FIG. 4 illustrates a step-down-step-up DC/DC converter according to a first embodiment.

FIG. 4 illustrates a first example of a step-down-step-up DC/DC converter.

An output section 1 includes switch circuits sw1 to sw4 and a choke inductor L. The switch circuit sw2 always operates as a diode whose anode is on the side of a ground GND while the switch circuit sw4 always operates as a diode whose anode is on the side of a node N2. The output section 1 outputs an output voltage Vout and an output current Io through the switch circuit sw4.

An input voltage Vin is supplied to the switch circuit sw1 through a resistor Rs1. Two ends of the resistor Rs1 are coupled to a current detector 2. The current detector 2 detects a current Ir which flows through the resistor Rs1 based on the potential difference between two terminals of the resistor Rs1 and outputs a sense current Is proportional to the current Ir.

The current Ir, which flows through the resistor Rs1, is a current that flows into the switch circuit sw1. That is, the current Ir serves as the current I3, which flows in state 3 in the step-down mode illustrated in FIG. 1. The current Ir also serves as the current I1, which flows in state 1, and the current I3, which flows in state 3, in the step-up mode illustrated in FIG. 3. The current Ir, which flows through the resistor Rs1, flows into the choke inductor L through the switch circuit sw1. That is, the current Ir is an inductor current which flows into the choke inductor L, and the current detector 2 detects the inductor current and outputs the sense current Is proportional to the inductor current.

An output terminal of the current detector 2 is coupled to a first terminal of a resistor Rs2 through a switch circuit sw5. A second terminal of the resistor Rs2 is coupled to the ground GND. Accordingly, when the switch circuit sw5 is turned on, a potential difference proportional to the sense current Is is generated between the terminals of the resistor Rs2. The potential difference is proportional to the current Ir, which flows through the detection resistor Rs1.

A node between the switch circuit sw5 and the resistor Rs2 is coupled to an input terminal of a compensation circuit 3. Accordingly, when the switch circuit sw5 is turned on, a voltage at the first terminal of the resistor Rs2, i.e., a sense voltage proportional to the current Ir, which flows through the detection resistor Rs1, is supplied to the input terminal of the compensation circuit 3. When the switch circuit sw5 is turned off, since the input terminal of the compensation circuit 3 is coupled to the ground GND through the resistor Rs2, an input voltage to the compensation circuit 3 is reset to the level of the ground GND.

Figure 5:
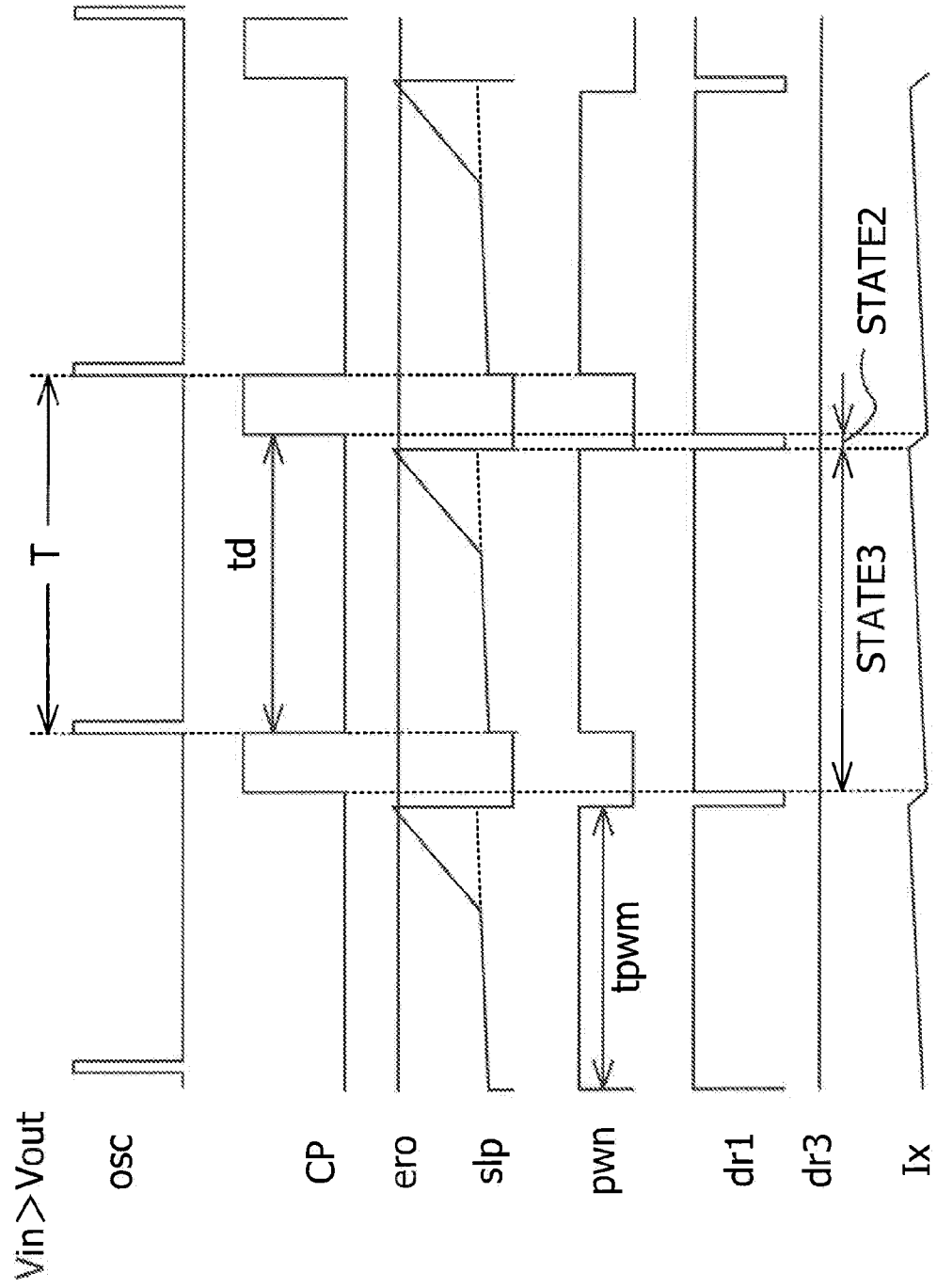
FIG. 5 illustrates timing waveforms indicating the operation of the first embodiment in FIG. 4.
Figure 6:
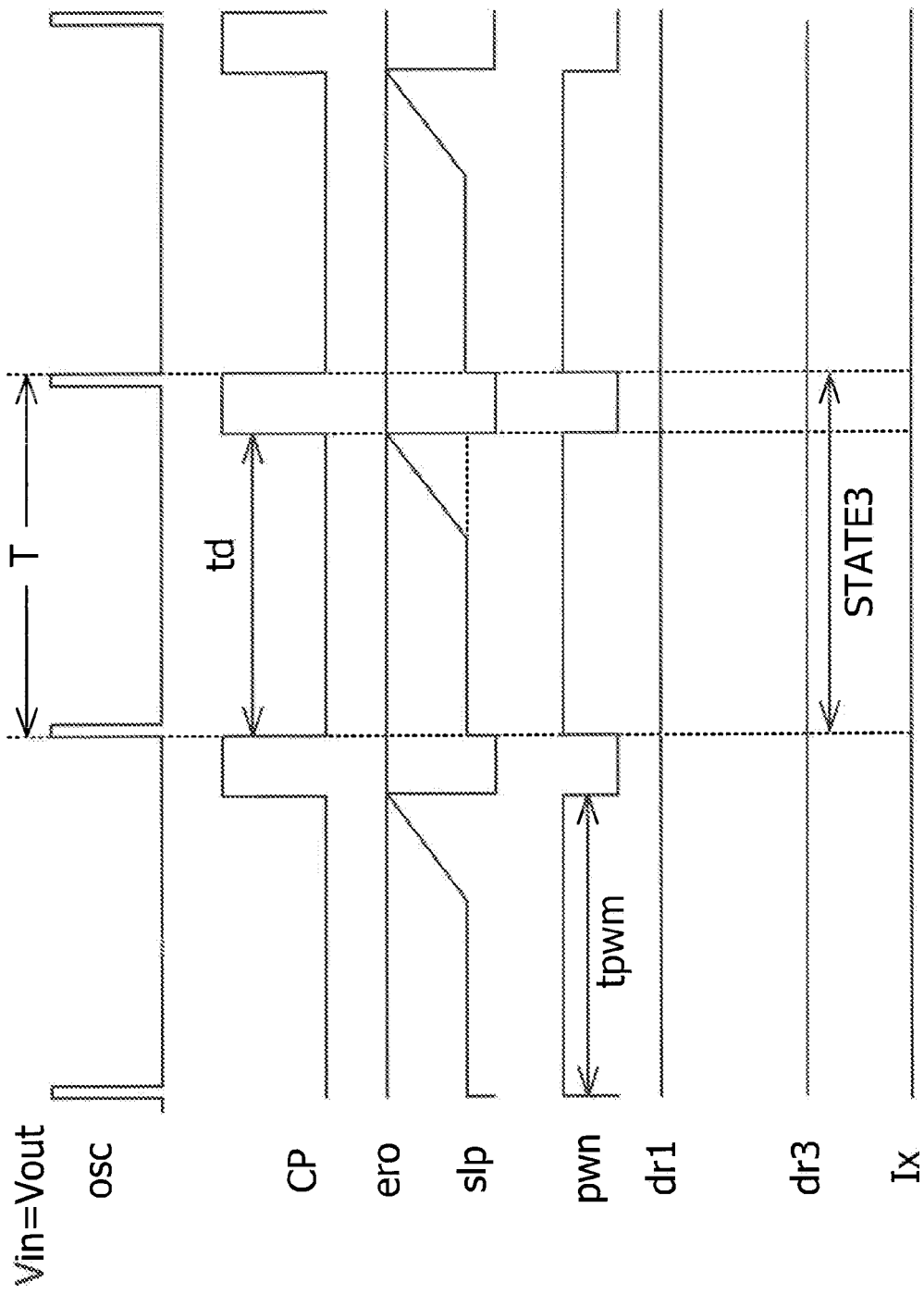
FIG. 6 illustrates timing waveforms indicating the operation of the first embodiment in FIG. 4.
Figure 7:
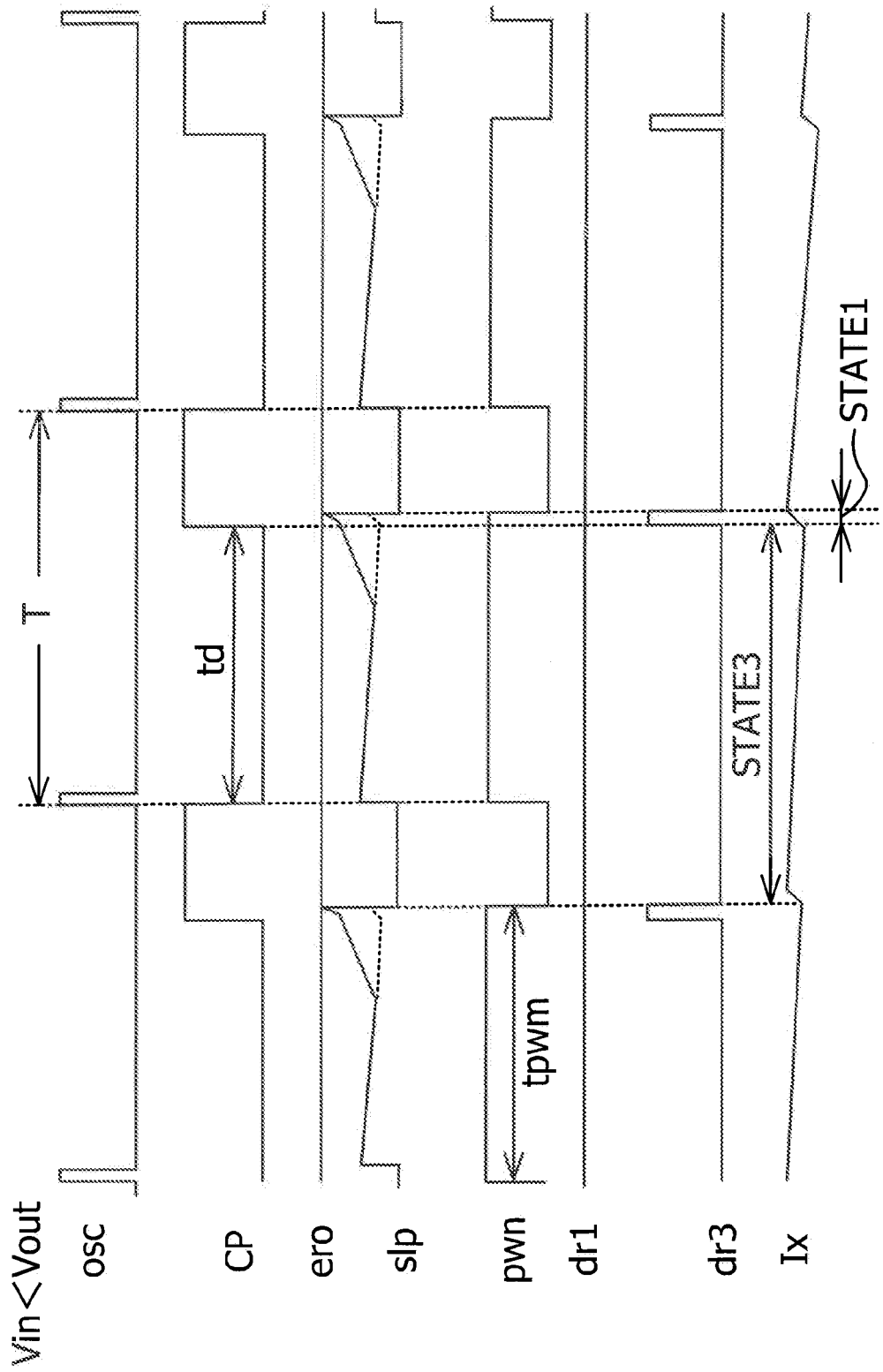
FIG. 7 illustrates timing waveforms indicating the operation of the first embodiment in FIG. 4.

The compensation circuit 3 generates a compensation signal slp of a voltage obtained by adding a predetermined ramp voltage to the input voltage and outputs the compensation signal slp to a plus-side input terminal of a comparator 4, as illustrated in FIGS. 5 to 7.

The output voltage Vout outputted from the output section 1 is divided by resistors R1 and R2, and a divided voltage is inputted to a minus-side input terminal of an error amplifier 5. A reference voltage Vref is inputted to a plus-side input terminal of the error amplifier 5. The error amplifier 5 reduces an output voltage ero when the output voltage Vout of the output section 1 rises and increases the output voltage ero when the output voltage Vout falls.

The output voltage ero of the error amplifier 5 is inputted to a minus-side input terminal of the comparator 4. The comparator 4 compares the compensation signal slp and the output voltage ero of the error amplifier 5. The comparator 4 outputs an output signal at H level when the compensation signal sip becomes higher than the output voltage ero and outputs an output signal at L level when the compensation signal slp becomes lower than the output voltage ero.

An output signal from the comparator 4 is inputted to a reset terminal R of a flip-flop circuit 6. An oscillation signal osc with a constant period outputted from an oscillator 15 is inputted to a set terminal S of the flip-flop circuit 6. The oscillation signal osc is outputted as a pulse signal which becomes H level with a constant period, as illustrated in FIG. 5.

Accordingly, an output signal pwm from the flip-flop circuit 6 rises to H level on the rising edge of the oscillation signal osc and falls when an output signal from the comparator 4 becomes H level.

The output signal pwm from the flip-flop circuit 6 is inputted to AND circuits 7a and 7b and an OR circuit 8 (a logic circuit).

The oscillation signal osc is inputted to a state controller 10, and the input voltage Vin, and output voltage Vout are inputted to the state controller 10. The state controller 10 outputs a control signal CP whose pulse width varies depending on the input voltage Vin and output voltage Vout with a constant period synchronized with the oscillation signal osc.

The control signal CP is inputted to the AND circuit 7b and OR circuit 8. An output signal from the OR circuit 8 is outputted as a driving signal dr1 for driving the switch circuit sw1 through a buffer circuit 9a. The switch circuit sw1 is turned on (brought into conduction) when the driving signal dr1 becomes H level and is turned off (brought out of conduction) when the driving signal dr1 becomes L level.

An output signal from the AND circuit 7b is outputted as a driving signal dr3 for driving the switch circuit sw3 through a buffer circuit 9b. The switch circuit sw3 is turned off (brought out of conduction) when the driving signal dr3 becomes L level and is turned on (brought into conduction) when the driving signal dr3 becomes H level.

The output signal from the buffer circuit 9a is inputted to the AND circuit 7a. An output signal from the AND circuit 7a is outputted as a control signal for the switch circuit sw5. When the output signal from the AND circuit 7a becomes H level, the switch circuit sw5 is turned on, and a voltage corresponding to the sense current Is outputted from the current detector 2 is supplied to the compensation circuit 3. When the output signal from the AND circuit 7a becomes L level, the switch circuit sw5 is brought out of conduction, and the input voltage to the compensation circuit 3 is reset to the level of the ground GND.

The configuration of the state controller 10 will be described with reference to FIG. 8. The output voltage Vout is divided by resistors R3 and R4, and a divided voltage is inputted to a minus-side input terminal of an amplifier 11.

The input voltage Vin is divided by resistors R5 and R6, and a divided voltage is inputted to a plus-side input terminal of the amplifier 11. An output voltage v1 of the amplifier 11 remains almost constant when the input voltage Vin and output voltage Vout are stable. The output voltage v1 decreases when the input voltage Vin decreases when the output voltage Vout is constant.

The output voltage v1 of the amplifier 11 is inputted to a minus-side input terminal of a comparator 12. A plus-side input terminal of the comparator 12 is coupled to the ground GND through a capacitance C1, and a current Iosc synchronized with the oscillation signal osc is supplied to the capacitance C1.

A drain of an N channel MOS transistor T1 is coupled to the plus-side input terminal of the comparator 12, and a source of the transistor T1 is coupled to the ground GND. The oscillation signal osc is inputted to a gate of the transistor T1 through a buffer circuit 9c.

Accordingly, when the oscillation signal osc becomes H level, the transistor T1 is turned on, and electric charge stored in the capacitance C1 is discharged. On the other hand, when the oscillation signal osc becomes L level, the transistor T1 is turned off, and the capacitance C1 is charged by the current Iosc.

Figure 15:
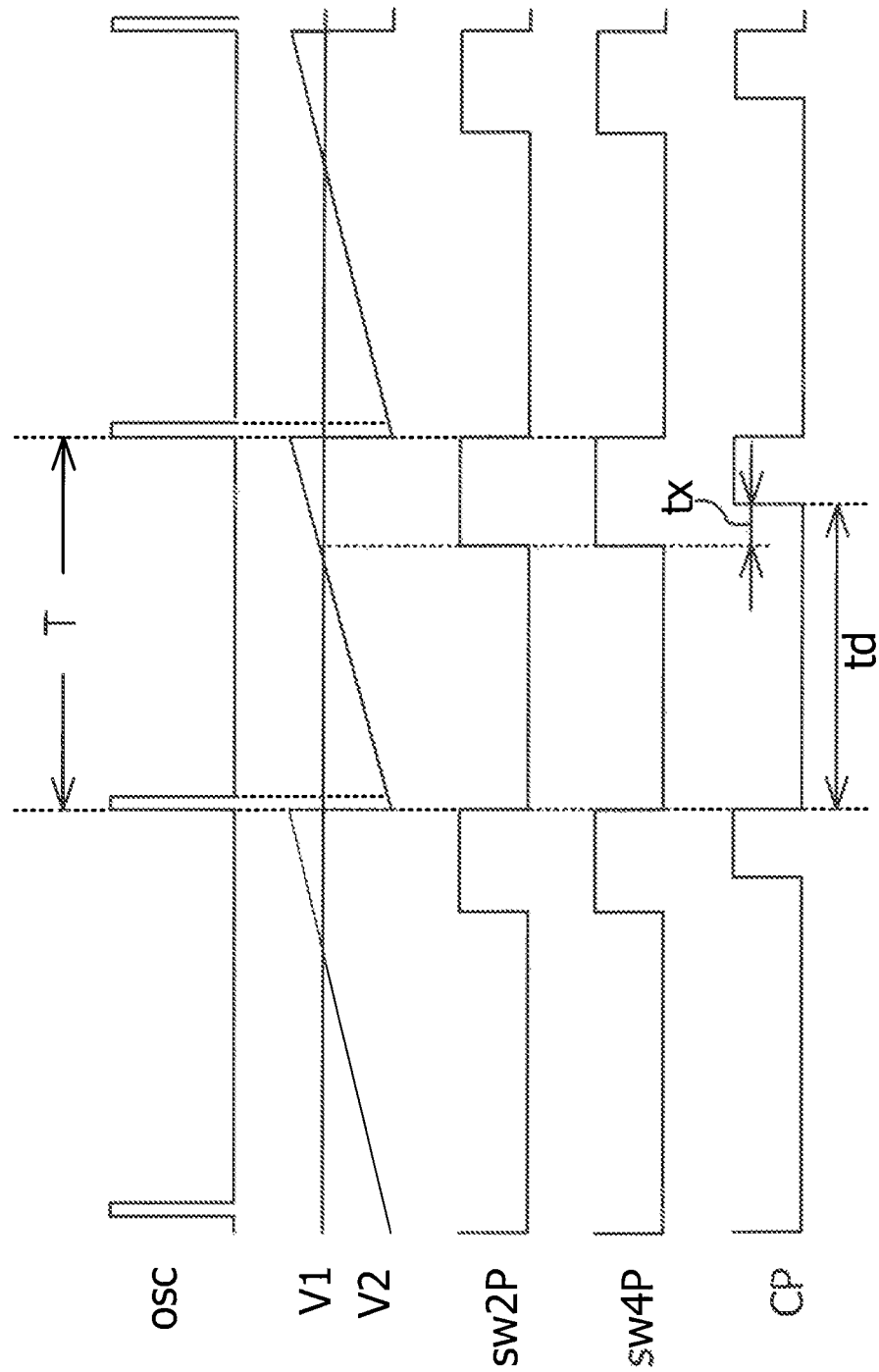
FIG. 15 illustrates timing waveforms indicating the operation of the state controller of the third embodiment in FIG. 12.

As a result, an input voltage v2 to the plus-side input terminal of the comparator 12 becomes almost the level of the ground GND when the oscillation signal osc becomes H level and gradually increases when the oscillation signal osc becomes L level, as illustrated in FIG. 15.

The comparator 12 compares the input voltages v1 and v2 and, when the input voltage v2 is higher than the input voltage v1, outputs an output signal at H level to a set terminal S of a flip-flop circuit 13. The oscillation signal osc after being inverted by an inverter circuit 14 is inputted to a reset terminal R of the flip-flop circuit 13. When the input signal to the reset terminal R becomes L level, the flip-flop circuit 13 resets an output signal Q to L level.

Accordingly, the flip-flop circuit 13 outputs the output signal Q at H level when the output signal from the comparator 12 becomes H level and resets the output signal Q to L level when the oscillation signal osc becomes H level. The output signal Q from the flip-flop circuit 13 is outputted as the control signal CP. The control signal CP has the similar waveform as adjustment signals sw2p and sw4p illustrated in FIG. 15.

in the state controller 10 with the above-described configuration, the pulse width varies in response to a change in the input voltage Vin. As illustrated in FIGS. 5 to 7, as the input voltage falls, the rising time of the control signal CP becomes earlier, and the pulse width of H level increases.

The operation of the step-down-step-up DC/DC converter with the above-described configuration will be described.

FIG. 5 illustrates the operation when the input voltage Vin is higher than the output voltage Vout, i.e., in the step-down mode. In this mode, the output signal pwm from the flip-flop circuit 6 and the control signal CP outputted from the state controller 10 do not become H level simultaneously. Accordingly, the driving signal dr3 for the switch circuit sw3 is fixed to L level, and the switch circuit sw3 is fixed to OFF.

The driving signal dr1 for the switch circuit sw1 becomes L level on the falling edge of the output signal pwm from the flip-flop circuit 6 and becomes H level on the rising edge of the control signal CP. The switch circuit sw1 is on/off driven accordingly. When the driving signal dr1 becomes H level, the switch circuit sw1 is turned on, and the step-down-step-up DC/DC converter enters a state indicated as state 3 illustrated in FIG. 4. On the other hand, when the driving signal dr1 becomes L level, the switch circuit sw1 is turned off, and the step-down-step-up DC/DC converter enters a state indicated as state 2 illustrated in FIG. 4.

In the above-described step-down mode, the higher the input voltage Vin is than the output voltage Vout, the longer a time td during which the control signal CP is at L level is, the relatively longer a time during which the driving signal dr1 is at L level is, and the longer a time during which the step-down-step-up DC/DC converter is in state 2 is. As the input voltage Vin becomes close to the output voltage Vout, the time td during which the control signal CP is at L level becomes shorter, the time during which the driving signal dr1 is at L level becomes relatively shorter, and a time during which the step-down-step-up DC/DC converter is in state 3 becomes longer.

The time td during which the control signal CP is at L level is automatically adjusted by the state controller 10 based on the potential difference between the input voltage Vin and the output voltage Vout to satisfy formula (3):

$$0 \le Ton\ \min + \left(1 - \frac{Vout}{Vin}\right)T \le t_d \le T \quad (3)$$

$$(Vin \ge Vout)$$

In formula (3), Ton min represents a minimum on-time of the output signal pwm from the flip-flop circuit 6. The time td is automatically adjusted within the range indicated by formula (3).

In the step-down mode, when the input voltage Vin falls to become close to the output voltage Vout, the time td becomes shorter, and the timing of rising of the control signal CP becomes earlier, as illustrated in FIG. 6. The time for state 2 becomes further shorter, and the time for state 3 becomes longer.

When the input voltage Vin becomes equal to the output voltage Vout, the timing of rising of the control signal CP and the timing of falling of the output signal pwm from the flip-flop circuit 6 coincide with each other, and the driving signal dr1 is fixed to H level. The driving signal dr3 is fixed to L level.

As a result, the switch circuit sw1 is kept ON, and the switch circuit sw3 is kept OFF. The state indicated as state 3 is maintained.

When the input voltage Vin further falls from the state illustrated in FIG. 6 and becomes lower than the output voltage Vout, the step-down-step-up DC/DC converter enters the step-up mode illustrated in FIG. 7. In this mode, the time td during which the control signal CP is at L level becomes further shorter, and the timing of rising of the control signal CP becomes earlier.

The control signal CP rises ahead of the falling edge of the output signal pwm from the flip-flop circuit 6. The driving signal dr3 becomes H level at a time when the output signal pwm and the control signal CP are both at H level, and the switch circuit sw3 is on/off driven.

Since the output signal pwm from the flip-flop circuit 6 and the control signal CP do not become L level simultaneously, the driving signal dr1 is fixed to H level, and the switch circuit sw1 is fixed to ON.

As a result, when the driving signal dr3 becomes H level, the switch circuit sw2 is turned on, and the step-down-step-up DC/DC converter enters the state indicated as state 1 illustrated in FIG. 4. On the other hand, when the driving signal dr3 becomes L level, the switch circuit sw3 is turned off, and the step-down-step-up DC/DC converter enters the state indicated as state 3 illustrated in FIG. 4.

In the above-described step-up mode, the lower the input voltage Vin is than the output voltage Vout, the shorter the time td during which the control signal CP is at L level is, the relatively longer a time during which the driving signal dr3 is at H level is, and the longer a time during which the step-down-step-up DC/DC converter is in state 1 is. As the input voltage Vin becomes close to the output voltage Vout, the time td during which the control signal CP is at L level becomes longer, the time during which the driving signal dr3 is at H level becomes relatively shorter, and the time during which the step-down-step-up DC/DC converter is in state 3 becomes longer.

The time td during which the control signal CP is at L level is automatically adjusted by the state controller 10 based on the potential difference between the input voltage Vin and the output voltage Vout to satisfy formula (4):

$$0 \le Ton\ \min + \left(\frac{Vin}{Vout} - 1\right)T \le t_d \le \frac{Vin}{Vout}T \quad (Vin \le Vout) \quad (4)$$

The time td is automatically adjusted within the range indicated by formula (4).

In the step-up mode, when the input voltage Vin rises to become close to the output voltage Vout, the time td becomes longer, and the timing of rising of the control signal CP becomes later, as illustrated in FIG. 6. The time for state 1 becomes further shorter, and the time for state 3 becomes longer. When the input voltage Vin becomes equal to the output voltage Vout, the step-down-step-up DC/DC converter enters the state illustrated in FIG. 6, and state 3 is maintained. When the input voltage Vin further rises from the state illustrated in FIG. 6, the step-down-step-up DC/DC converter shifts to the step-down mode illustrated in FIG. 5.

The operation in the above-described step-down mode is represented by formula (5):

$$\frac{Vout}{Vin} = \frac{t_{pwm} + (T - t_d)}{T} \quad (5)$$

where tpwm represents the duration of H level of the output signal pwm from the flip-flop circuit 6. In formula (5), the time td represents a time determined by the input voltage Vin and output voltage Vout and a period T of the oscillation signal osc, and is arbitrarily set within the range indicated by formula (3).

In the step-down mode, tpwm<td holds, and tpwm is controlled such that the output voltage Vout becomes a predetermined voltage set by the reference voltage Vref (e.g., 3.2 V). When tpwm is adjusted such that tpwm=td holds, the input voltage Vin and the output voltage Vout coincide with each other.

The operation in the above-described step-up mode is represented by formula (6):

$$\frac{Vout}{Vin} = \frac{T}{T - (t_{pwm} - t_d)} \quad (6)$$

In formula (6), the time td represents a time determined by the input voltage Vin and output voltage Vout, and the period T of the oscillation signal osc, and is arbitrarily set within the range indicated by formula (4).

In the step-up mode, tpwm>td holds, and tpwm is controlled such that the output voltage Vout becomes a predetermined voltage set by the reference voltage Vref (e.g., 3.2 V). When tpwm is adjusted such that tpwm=td holds, the input voltage Vin and the output voltage Vout coincide with each other.

With the above-described operations, it may be possible to automatically shift from the step-down mode to the step-up mode and from the step-up mode to the step-down mode. Note that, in FIGS. 5 to 7, Ix represents a current that flows through the choke inductor L in each mode.

When the output voltage Vout falls, the error amplifier 5 and comparator 4 operate, thereby adjusting the pulse width of the output signal pwm from the flip-flop circuit 6 such that the output voltage Vout is restored to a predetermined value. This operation is similar to the operation of a conventional DC/DC converter.

The step-down-step-up DC/DC converter as described above may attain the working effects below.

(1) The step-down-step-up DC/DC converter is capable of shifting directly from the step-up mode to the step-down mode or from the step-down mode to the step-up mode without going through the step-down-step-up mode with operation in state 1 and operation in state 2 during one cycle of step-down-step-up operation. It may be thus possible to improve the power efficiency of step-down-step-up operation when the potential difference between the input voltage Vin and the output voltage Vout is small.

(2) The step-down-step-up DC/DC converter is capable of shifting continuously and automatically from the step-up mode to the step-down mode or from the step-down mode to the step-up mode in response to a change in the input voltage Vin.

(3) Since one of the switch circuits is on/off controlled in the step-up mode and in the step-down mode, it may be possible to reduce a power loss caused by on/off control of a switching element and improve the power efficiency.

(4) Since when the input voltage Vin and the output voltage Vout are equal to each other, state 3 is maintained without on/off driving of the switch circuits, it may be possible to reduce a power loss caused by on/off control of a switching element and improve the power efficiency.

(5) The step-down-step-up DC/DC converter is capable of controlling the on/off timing of each switch circuit in accordance with the control signal CP generated based on the input voltage Vin and output voltage Vout, regardless of the minimum on-time of the output signal pwm from the flip-flop circuit 6 associated with the response speeds of the comparator 4 and flip-flop circuit 6. Since the on-time or off-time of each switch circuit may be continuously adjusted until the on-time or off-time becomes 0, the step-down-step-up DC/DC converter is capable of shifting continuously from the step-up mode to the step-down mode or from the step-down mode to the step-up mode.

Figure 9:
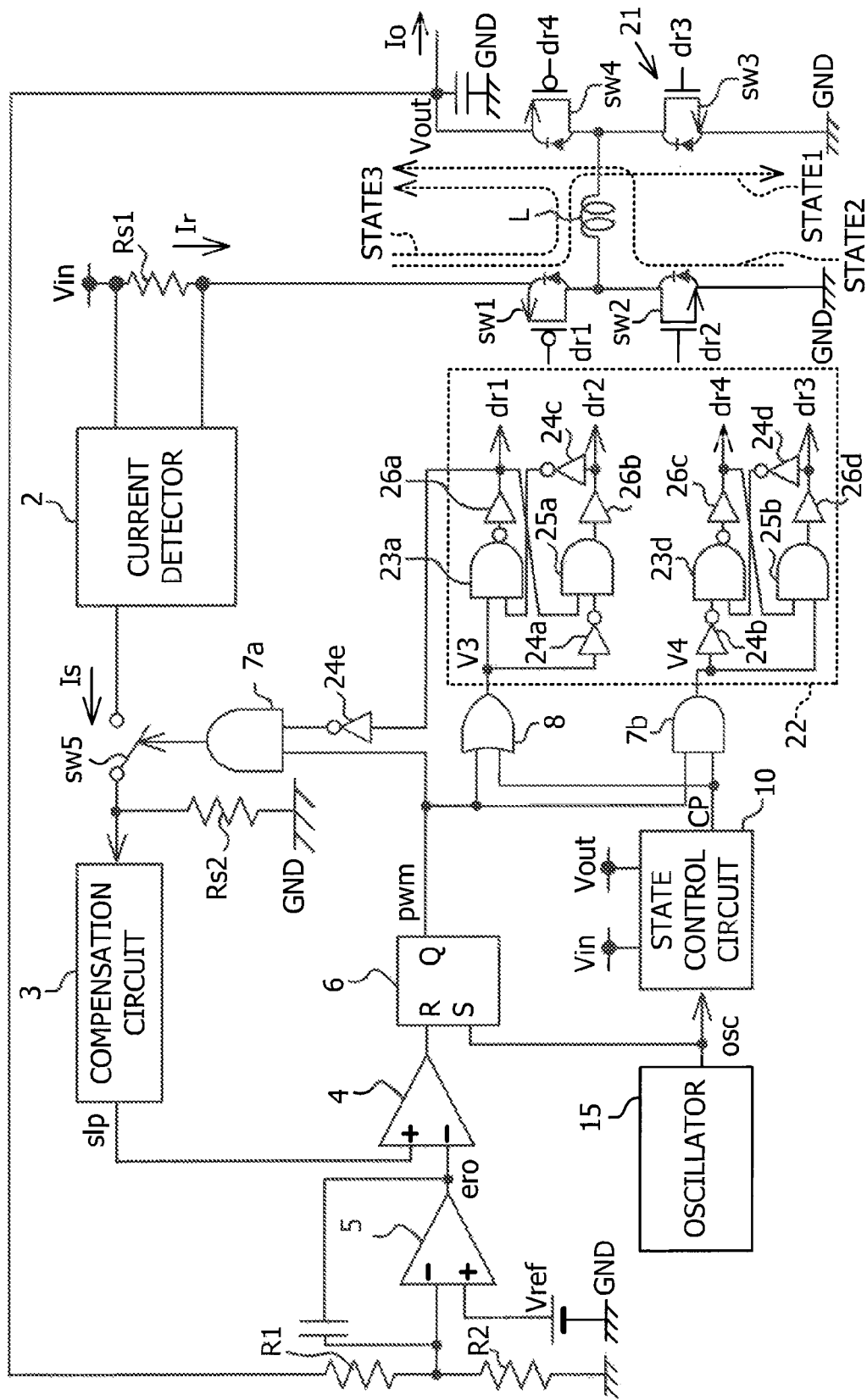
FIG. 9 illustrates a step-down-step-up DC/DC converter according to a second embodiment.
Figure 10:
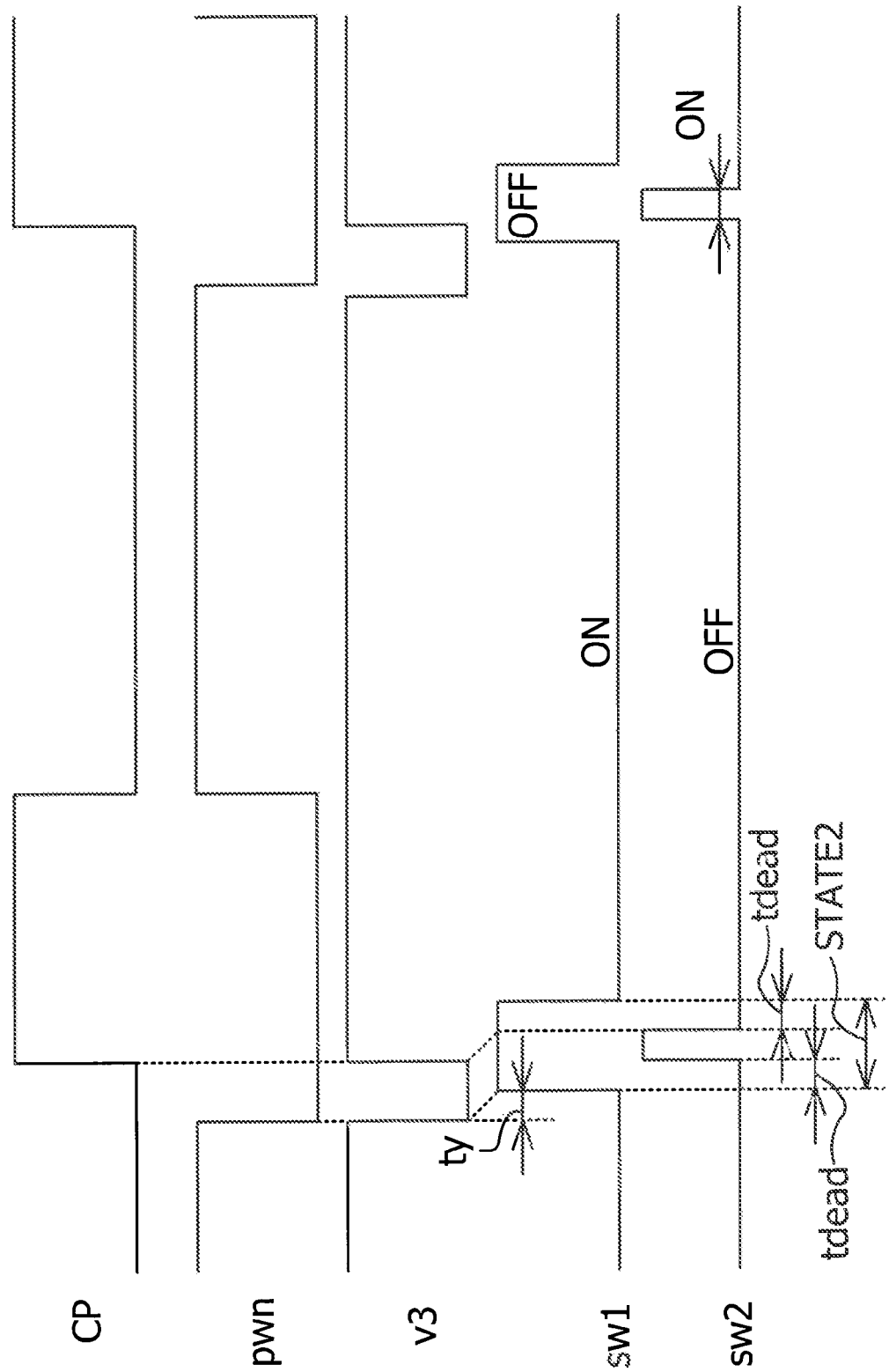
FIG. 10 illustrates timing waveforms indicating the operation of the second embodiment in FIG. 9.
Figure 11:
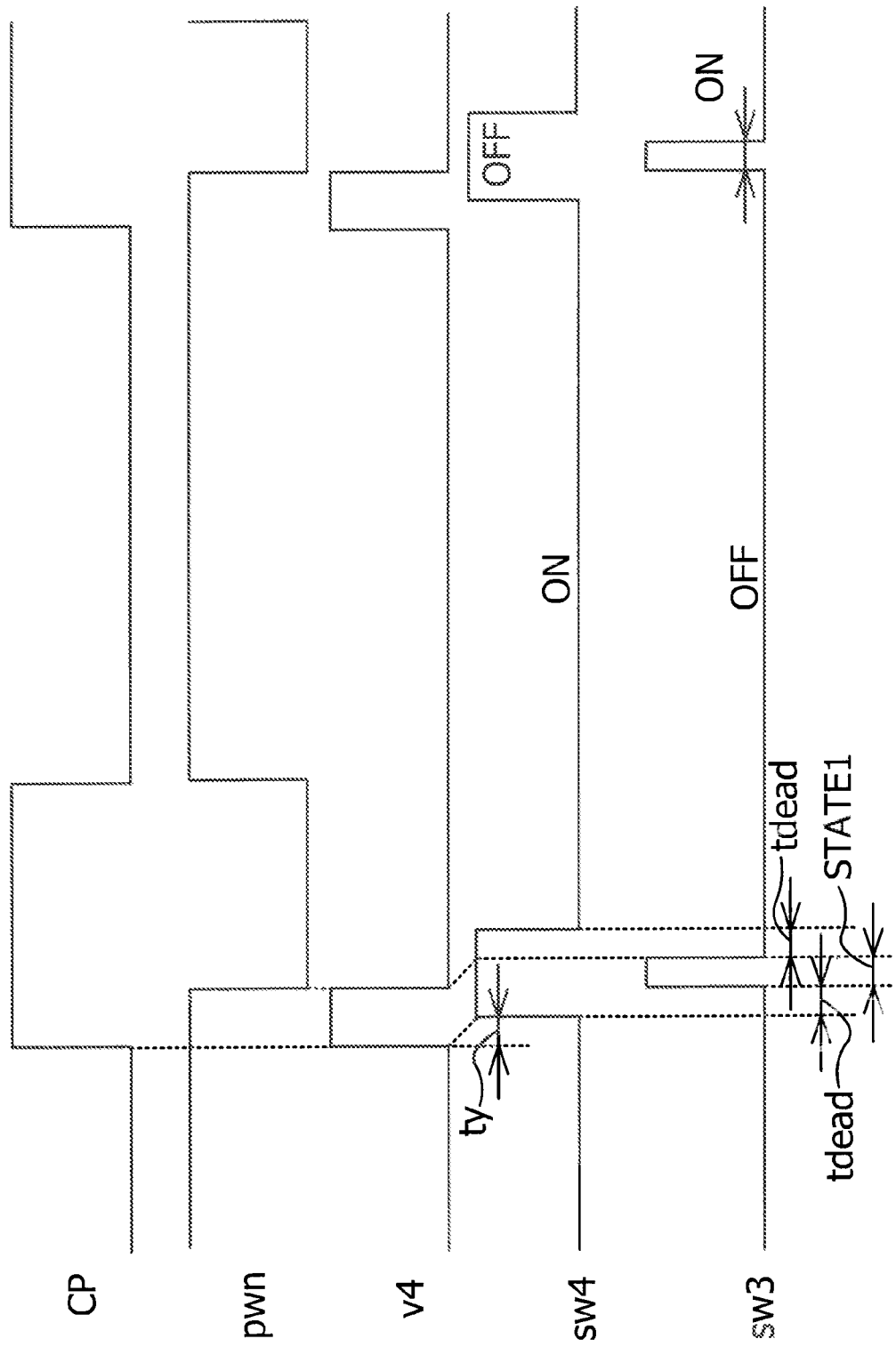
FIG. 11 illustrates timing waveforms indicating the operation of the second embodiment in FIG. 9.

FIGS. 9 to 11 illustrate a second example. The first example discloses a step-down-step-up DC/DC converter that operates in the step-up mode and in the step-down mode by asynchronous rectification, which does not include switching-controlling the switch circuits sw2 and sw4. In contrast, the second example discloses a circuit that performs synchronous rectification operation, including switching-controlling switch circuits sw2 and sw3 of an output section 21, in order to improve the power efficiency.

The output section 21 illustrated in FIG. 9 switching-controls switch circuits sw1 to sw4. The switch circuits sw1 and sw4 are, for example, P channel MOS transistors. The switch circuits sw2 and sw3 are, for example, N channel MOS transistors.

For open/close control of the switch circuits sw1 to sw4, the switch circuits sw1 to sw4 are controlled by driving signals dr1 to dr4 outputted from a penetration prevention circuit 22. The penetration prevention circuit 22 generates the driving signals dr1 to dr4 based on output signals from an OR circuit 8 and an AND circuit 7b, which output signals similar to ones in the first example. Similar reference numerals are used to refer to those components of the second example that correspond to similar components of the first example, and a description thereof will be omitted.

The penetration prevention circuit 22 is provided to prevent the switch circuits sw1 and sw2, or the switch circuits sw3 and sw4, from being simultaneously turned on thereby causing a penetration current to flow. For example, an output signal v3 from the OR circuit 8 is inputted to a NAND circuit 23a and an inverter circuit 24a.

An output signal from the NAND circuit 23a is outputted as the driving signal dr1 through a buffer circuit 26a, and the driving signal dr1 is inputted to an AND circuit 7a through an inverter circuit 24e.

An output signal from the inverter circuit 24a is inputted to an AND circuit 25a, and an output signal from the buffer circuit 26a is inputted to the AND circuit 25a. An output signal from the AND circuit 25a is outputted as the driving signal dr2 through a buffer circuit 26b, and the driving signal dr2 is inputted to the NAND circuit 23a through the buffer circuit 26b and an inverter circuit 24c.

An output signal v4 from the AND circuit 7b is inputted to an AND circuit 25b and an inverter circuit 24b.

An output signal from the AND circuit 25b is outputted as the driving signal dr3 through a buffer circuit 26d, and the driving signal dr3 is inputted to a NAND circuit 23b through an inverter circuit 24d.

An output signal from the inverter circuit 24b is inputted to the NAND circuit 23b. An output signal from the NAND circuit 23b is outputted as the driving signal dr4 through a buffer circuit 26c, and the driving signal dr4 is inputted to the AND circuit 25b.

Since the buffer circuits 26a to 26d drive large gate capacitances of the switch circuits sw1 to sw4, the operation delay times of the buffer circuits 26a to 26d are longer than those of the other AND circuits, NAND circuits, and inverter circuits.

FIG. 10 illustrates the operation of generating the driving signals dr1 and dr2 by the penetration prevention circuit 22. The output signal v3 from the OR circuit 8 becomes L level when an output signal pwm from a flip-flop circuit 6 and an output signal CP from a state controller 10 both become L level.

The driving signal dr1 rises behind the falling edge of the input signal v3 by the operation delay time of the buffer circuit 26a and falls behind the rising edge of the input signal v3 by the operation delay times of the buffer circuits 26b and 26a. Accordingly, the pulse width of H level of the driving signal dr1 becomes larger than the pulse width of L level of the input signal v3.

The driving signal dr2 rises behind the rising edge of the driving signal dr1 by the operation delay time of the buffer circuit 26b and falls behind the rising edge of the input signal v3 by the operation delay time of the buffer circuit 26b.

As may be seen from the above-described operation, the driving signal dr2 rises behind the rising edge of the driving signal dr1 and falls ahead of the falling edge of the driving signal dr1. Accordingly, in case that the switch circuits sw1 and sw2 are switching-controlled in states 2 and 3, a penetration current is prevented from being generated due to simultaneous turn-on of the switch circuits sw1 and sw2.

FIG. 11 illustrates the operation of generating the driving signals dr3 and dr4 by the penetration prevention circuit 22. The output signal v4 from the AND circuit 7b becomes H level when the output signal pwm from the flip-flop circuit 6 and the output signal CP from the state controller 10 both become H level.

The driving signal dr4 rises behind the rising edge of the input signal v4 by the operation delay time of the buffer circuit 26c and falls behind the falling edge of the input signal v4 by the operation delay times of the buffer circuits 26d and 26c. Accordingly, the pulse width of H level of the driving signal dr4 becomes larger than the pulse width of H level of the input signal v4.

The driving signal dr3 rises behind the rising edge of the driving signal dr4 by the operation delay time of the buffer circuit 26d and falls behind the rising edge of the input signal v4 by the operation delay time of the buffer circuit 26d. Note that, in FIG. 10, a time ty is a delay time from when the input signal v3 rises to when the switch circuit sw1 is turned on. The similar applies to FIG. 11.

As may be seen from the above-described operation, the driving signal dr3 rises behind the rising edge of the driving signal dr4 and falls ahead of the falling edge of the driving signal dr4. Accordingly, when the switch circuits sw3 and sw4 are switching-controlled in states 1 and 3, a penetration current is prevented from being generated due to simultaneous turn-on of the switch circuits sw3 and sw4.

The step-down-step-up DC/DC converter with the above-described configuration is capable of performing synchronous rectification operation by the output section 21, in addition to the working effects attained by the first example. The power efficiency may be further improved. The step-down-step-up DC/DC converter is also capable of preventing a penetration current from being generated in the output section 21.

FIGS. 12 to 17 illustrate a third example. This example discloses a synchronous rectification type step-down-step-up DC/DC converter obtained by further improving the second example.

In the second example, there is a dead time tdead from when the driving signal dr1 rises to when the driving signal dr2 rises, and from when the driving signal dr2 falls to when the driving signal dr1 falls, as illustrated in FIG. 10. In FIG. 11, as well, there is the dead time tdead from when the driving signal dr4 rises to when the driving signal dr3 rises, and from when the driving signal dr3 falls to when the driving signal dr4 falls.

The dead time is determined by the operation delay times of the buffer circuits 26a to 26d, and may not be controlled by the output signal pwm from the flip-flop circuit 6 and the output signal CP from the state controller 10.

In the step-down mode illustrated in FIG. 10, when the switch circuit sw1 is turned off, a body diode of the switch circuit sw2 brings the switch circuit sw2 into conduction, and the synchronous rectification type step-down-step-up DC/DC converter enters a state indicated as state 2. That is, the step-down-step-up DC/DC converter is in the state indicated as state 2 during a period when the switch circuit sw1 is OFF. The duration of state 2 may be controlled to be equal to the duration of a time during which the output signal v3 from the OR circuit 8, determined based on the control signal CP, and the output signal pwm from the flip-flop circuit 6 is at L level. However, since the switch circuit sw1 is switched from OFF to ON after the switch circuit sw2 is turned off, the duration of state 2 may not be controlled to end during the dead time tdead when the switch circuit sw2 is switched from ON to OFF.

Accordingly, in the step-down mode, a duration tpwm of H level of the output signal pwm from the flip-flop circuit 6 may be controlled to last until the duration tpwm becomes equal to a duration of td−tdead with respect to a time td of L level of the control signal CP. That is, the duration tpwm may not be controlled to last until tpwm=td holds.

In the step-up mode illustrated in FIG. 11, a period when the switch circuit sw4 is OFF, and the switch circuit sw3 is ON corresponds to state 1. The duration of state 1 may be controlled to be equal to the duration of a time during which the output signal v4 from the AND circuit 7b, determined based on the control signal CP, and the output signal pwm from the flip-flop circuit 6 is at H level. However, since the switch circuit sw3 is switched from OFF to ON after the switch circuit sw4 is turned off, the duration of state 1 may not be controlled to end during the dead time tdead when the switch circuit sw4 is switched from ON to OFF.

Accordingly, in the step-up mode, the duration tpwm of H level of the output signal pwm from the flip-flop circuit 6 may not be controlled to end until the duration tpwm becomes equal to a duration of td+tdead with respect to the time td of L level of the control signal CP. As may be seen from this, the output voltage Vout may not be controlled such that the duration tpwm falls within the range of from td−tdead to td+tdead.

Figure 18:
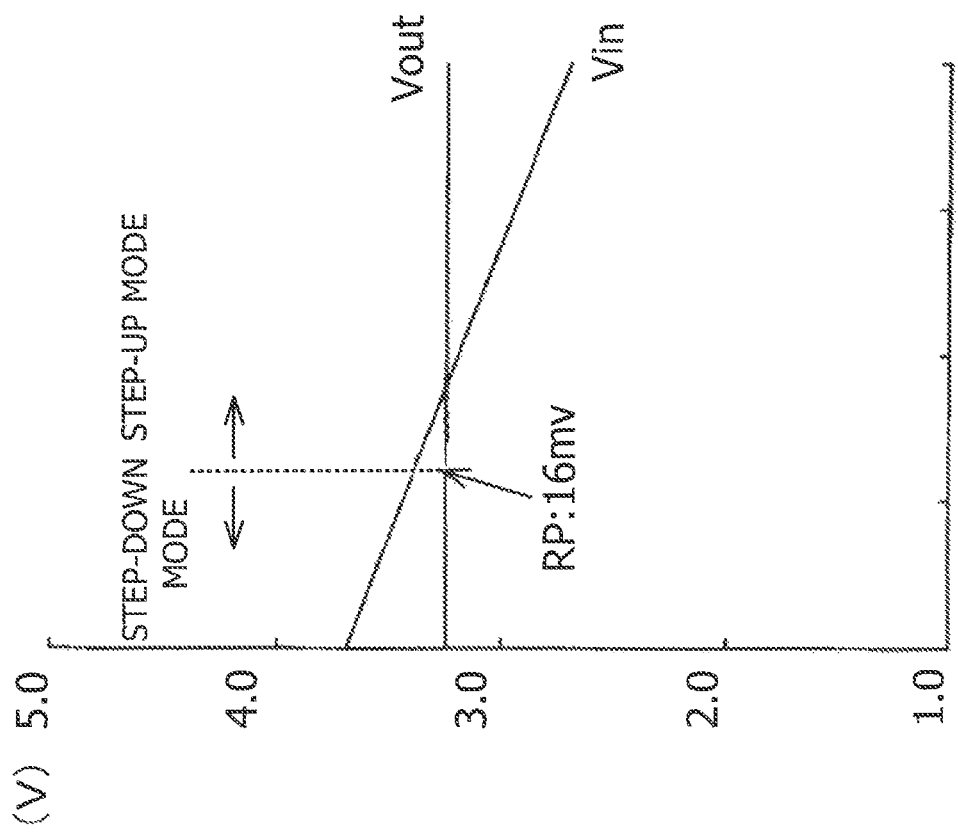
FIG. 18 illustrates the input-output voltage characteristic of the second embodiment in FIG. 9.

As a result, a ripple RP is generated in the output voltage Vout at the boundary between the step-down mode and the step-up mode, as illustrated in FIG. 18. Note that FIG. 18 illustrates a simulation result when an output current Io is set to 400 mA. The effect of losses due to the on-resistances of the transistors of the output section 21 causes the changeover point between the step-down mode and the step-up mode to be shifted from a point where Vin=Vout holds.

This embodiment discloses a configuration for reducing the ripple RP in the output voltage Vout generated in the second embodiment as described above.

Figure 12:
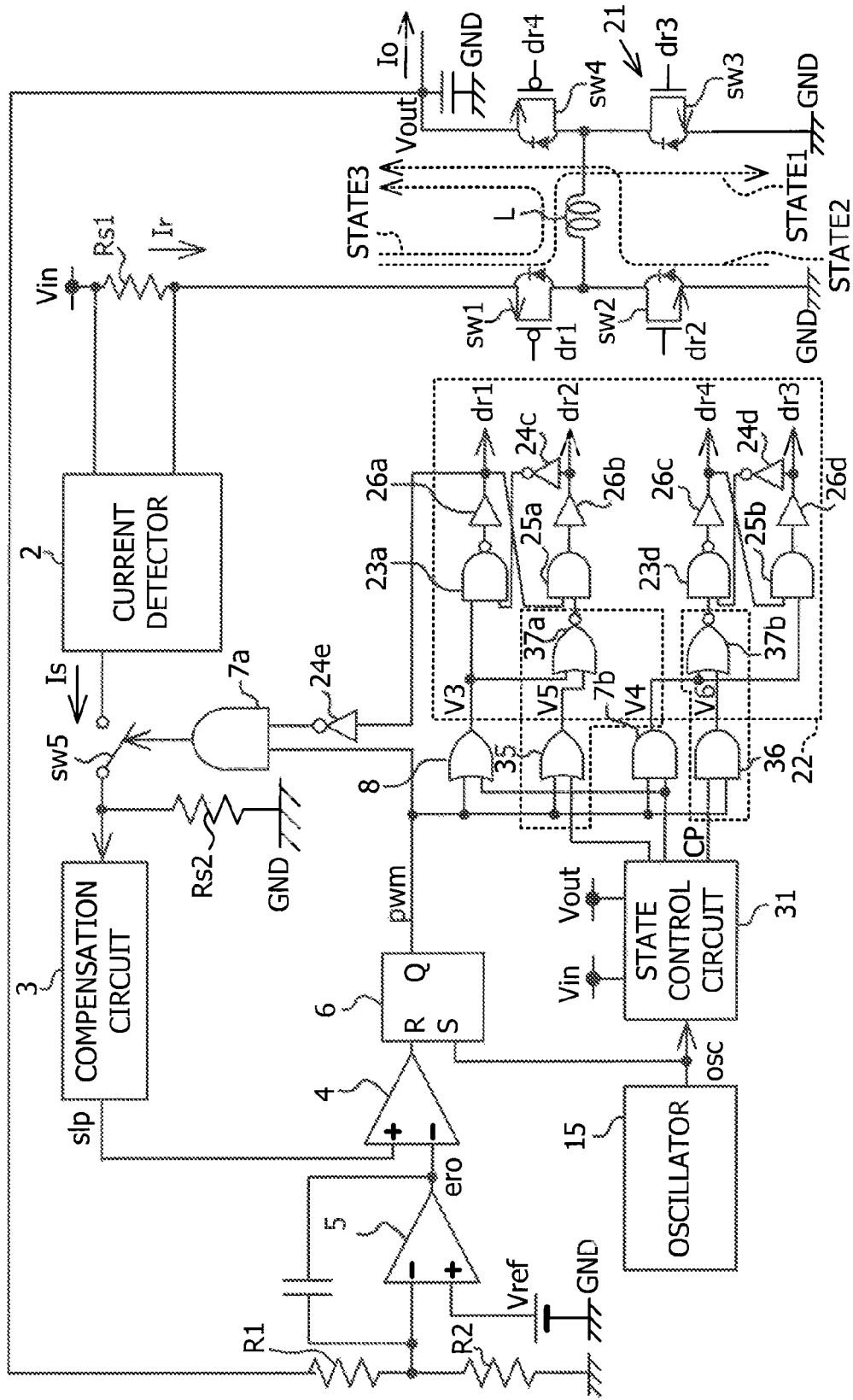
FIG. 12 illustrates a step-down-step-up DC/DC converter according to a third embodiment.
Figure 13:
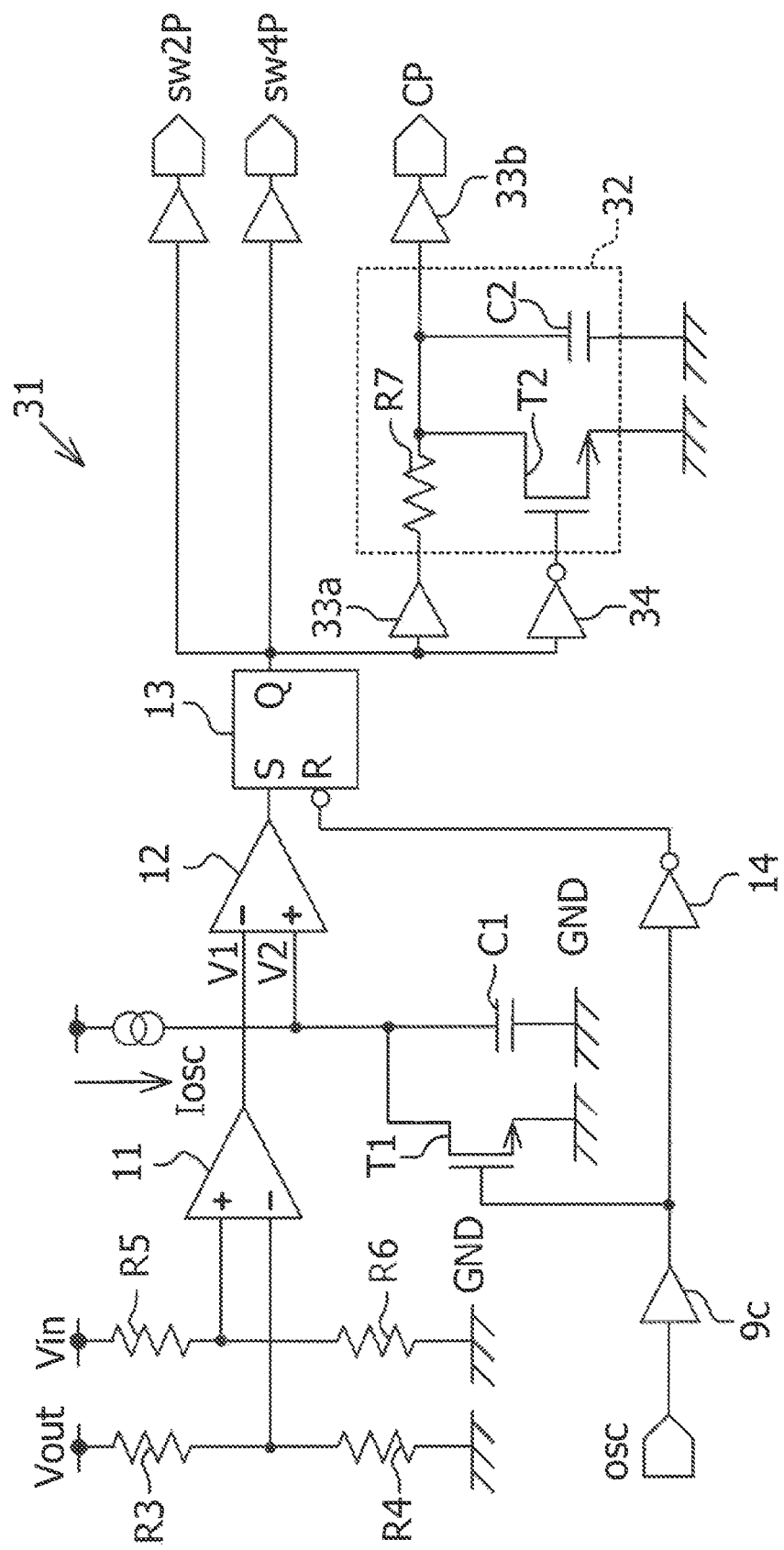
FIG. 13 illustrates a state controller of the third embodiment in FIG. 12.

As illustrated in FIG. 12, a state controller 31 outputs a control signal CP and adjustment signals sw2p and sw4p. The configuration of the state controller 31 is illustrated in FIG. 13. The state controller 31 is obtained by adding a delay circuit 32 to a state controller 10 illustrated in FIG. 8 and is configured to output, as the adjustment signals sw2p and sw4p, an output signal from a flip-flop circuit 13 and output the control signal CP from the delay circuit 32. The remaining elements of FIG. 12 are similar to a corresponding part of the state controller 10. As such, similar reference numerals are used, and a detailed description thereof will be omitted.

In the delay circuit 32, the output signal from the flip-flop circuit 13 is inputted to a buffer circuit 33a and an inverter circuit 34. An output signal from the buffer circuit 33a is inputted to a buffer circuit 33b through a resistor R7, and the control signal CP is outputted from the buffer circuit 33b.

An output signal from the inverter circuit 34 is inputted to a gate of an N channel MOS transistor T2. A drain of the transistor T2 is coupled to an input terminal of the buffer circuit 33b, and a source is coupled to a ground GND. A capacitance C2 is coupled between the input terminal of the buffer circuit 33b and the ground GND.

In the above-described delay circuit 32, when the output signal from the flip-flop circuit 13 is at L level, the transistor T2 is turned on, the input signal to the buffer circuit 33b becomes L level, and the control signal CP becomes L level.

When the output signal from the flip-flop circuit 13 rises to H level, the output signal from the inverter circuit 34 becomes L level, and the transistor T2 is turned off. Although the output signal from the buffer circuit 33a becomes H level, an input voltage to the buffer circuit 33b rises gently due to the time constants of the resistor R7 and capacitance C2.

As a result, rising of the control signal CP lags behind rising of each of the adjustment signals sw2p and sw4p by a delay time tx, as illustrated in FIG. 15. When the output signal from the flip-flop circuit 13 falls, since the transistor T2 is turned on, and electric charge stored in the capacitance C2 is quickly released, falling of the control signal CP does not lag behind falling of each of the adjustment signals sw2p and sw4p.

Figure 14:
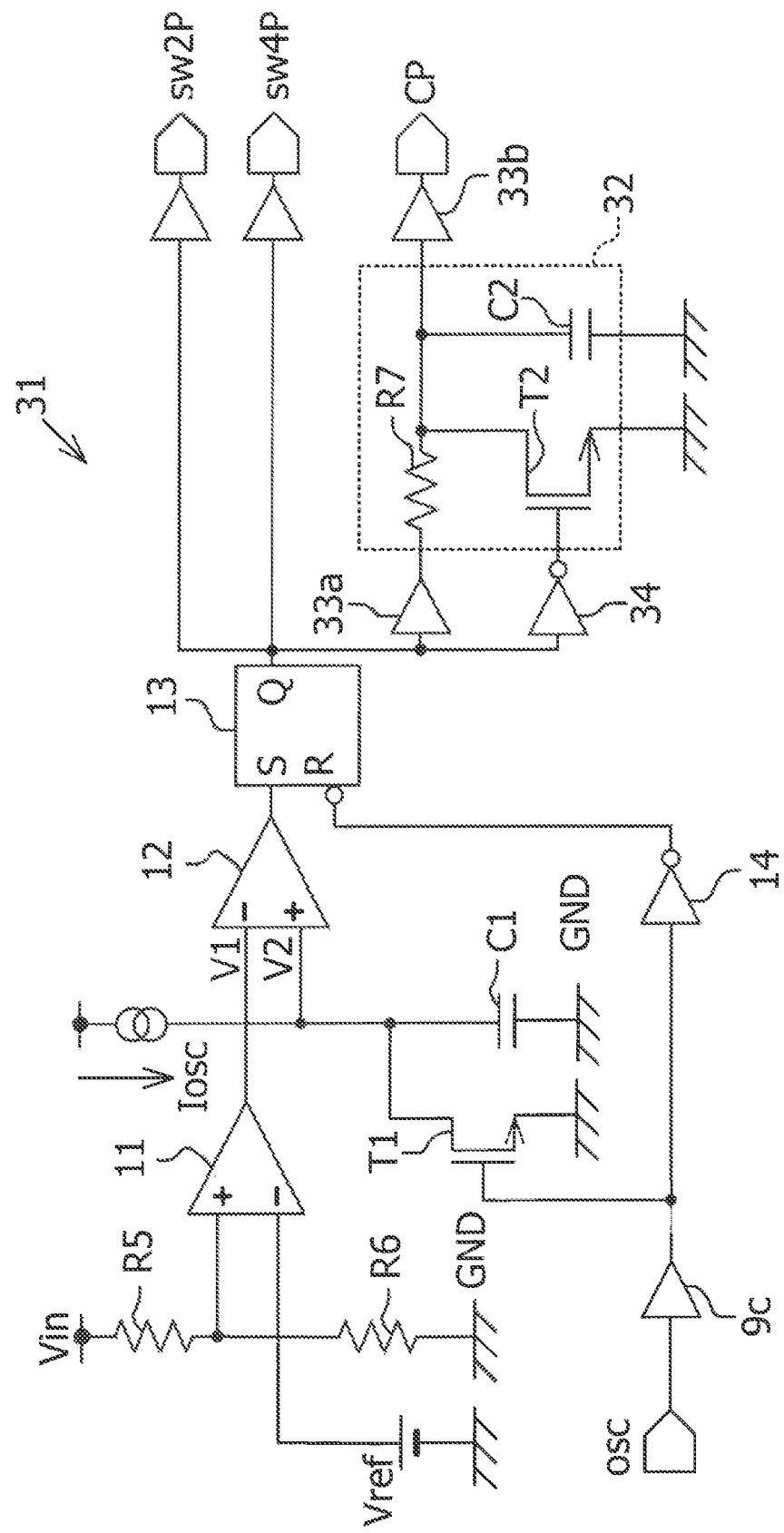
FIG. 14 illustrates another state controller of the third embodiment in FIG. 12.

Note that the state controller 31 may compare an input voltage Vin and a reference voltage Vref by an amplifier 11, as illustrated in FIG. 14. Similarly, the amplifier 11 may be configured to compare the input voltage Vin and the reference voltage Vref in the state controller 10 (see FIG. 8) according to the first or second example.

As illustrated in FIG. 12, the control signal CP outputted from the state controller 31 is inputted to an OR circuit 8 and an AND circuit 7b. The adjustment signal sw2p is inputted to an OR circuit 35, and an output signal pwm from a flip-flop circuit 6 described above is inputted to the OR circuit 35.

The adjustment signal sw4p is inputted to an AND circuit 36, and the output signal pwm from the flip-flop circuit 6 is inputted to the AND circuit 36.

An output signal v3 from the OR circuit 8 is inputted to a NAND circuit 23a and a NOR circuit 37a, and an output signal v5 from the OR circuit 35 is inputted to the NOR circuit 37a. An output signal from the NOR circuit 37a is inputted to an AND circuit 25a.

An output signal v4 from the AND circuit 7b is inputted to a NOR circuit 37b and to an AND circuit 25b. An output signal v6 from the AND circuit 36 is also inputted to the NOR circuit 37b, and an output signal from the NOR circuit 37b is inputted to a NAND circuit 23b.

The NAND circuits 23a and 23b, the AND circuits 25a and 25b, buffer circuits 26a to 26d, and inverter circuits 24c and 24d operate in a similar manner as the penetration prevention circuit 22 of the second example illustrated in FIG. 9. The configuration of the remaining components is similar to that the corresponding components in the second example.

Figure 16:
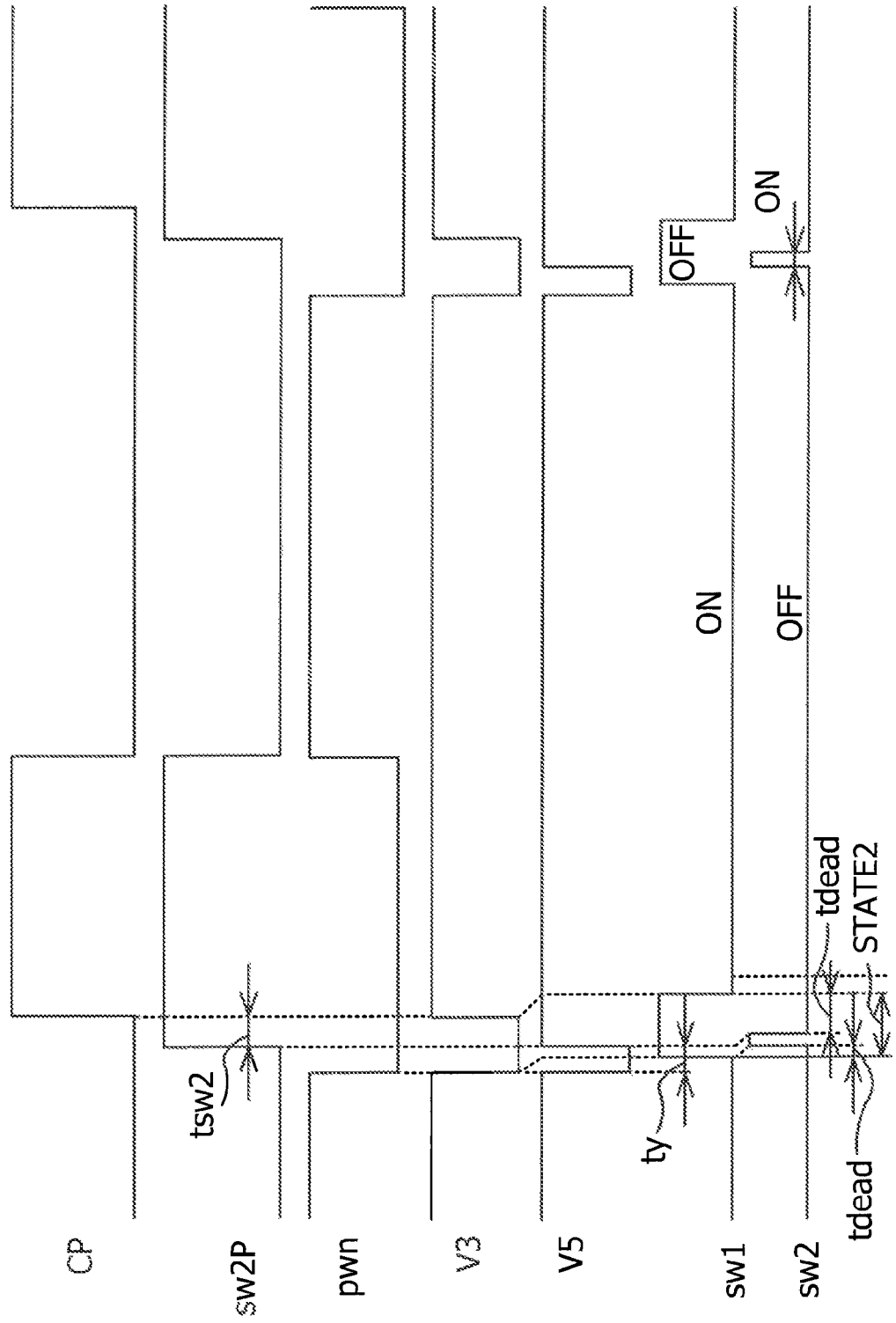
FIG. 16 illustrates timing waveforms indicating the operation of the third embodiment in FIG. 12.

FIG. 16 illustrates the operation of the DC/DC converter of this example in the step-down mode. According to this example, it may be possible to generate the adjustment signal sw2p, which rises ahead of rising of the control signal CP by a time tsw2, by operation of the state controller 31 and turn off a switch circuit sw2 earlier by the time tsw2 using the output signal v5 generated from the adjustment signal sw2p.

Accordingly, when the time tsw2 is not less than a dead time tdead, a switch circuit sw1 may be turned on immediately on the rising edge of the output signal v3. It may be thus possible to control the duration of state 2 using the output signal v3 from the OR circuit 8 based on the control signal CP and the output signal pwm from the flip-flop circuit 6.

Figure 17:
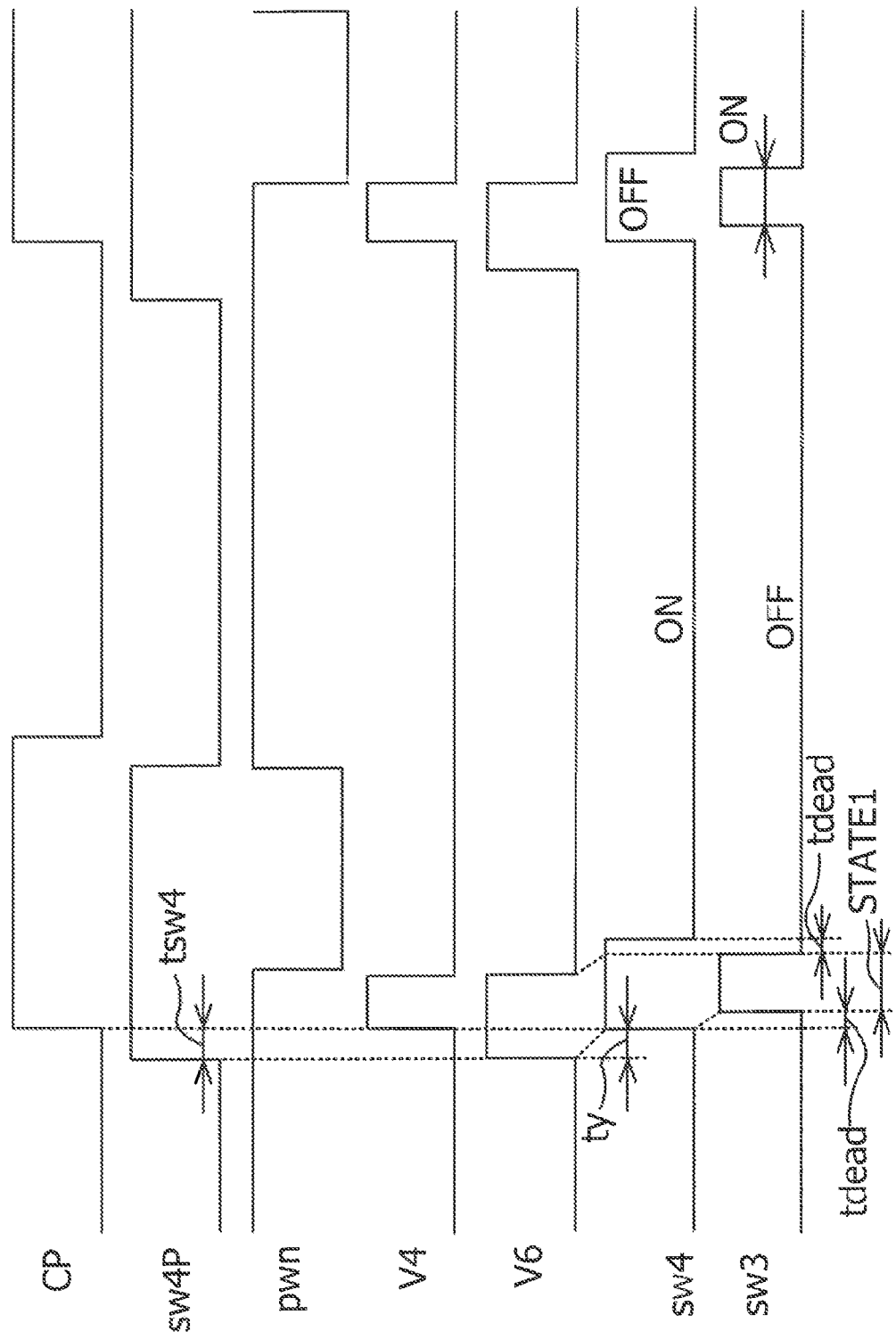
FIG. 17 illustrates timing waveforms indicating the operation of the third embodiment in FIG. 12.

Similarly, in the step-up mode illustrated in FIG. 17, it may be possible to turn off a switch circuit sw4 earlier by a time tsw4 using the output signal v6 generated from the adjustment signal sw4p, which rises ahead of rising of the control signal CP by the time tsw4.

Accordingly, when the time tsw4 is not less than the dead time tdead, the switch circuit sw4 may be turned on immediately on the rising edge of the output signal v4. It may be thus possible to control the duration of state 1 using the output signal v4 from the AND circuit 7b based on the control signal CP and the output signal pwm from the flip-flop circuit 6.

As a result, the durations of states 1 and 2 may be controlled using the control signal CP and output signal pwm. It may be thus possible to control the DC/DC converter to shift continuously from the step-down mode to the step-up mode or from the step-up mode to the step-down mode.

Figure 19:
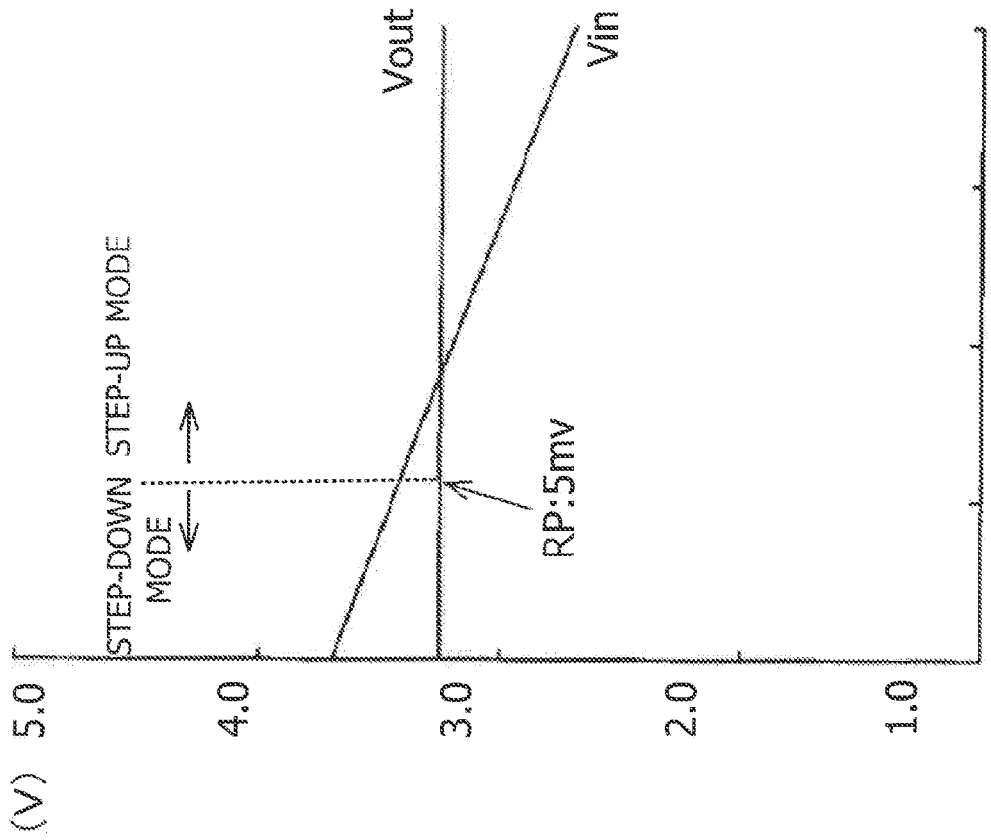
FIG. 19 illustrates the input-output voltage characteristic of the third embodiment in FIG. 12.

FIG. 19 illustrates a simulation result when an output current Io is set to 400 mA. A ripple RP generated in an output voltage Vout at the boundary between the step-down mode and the step-up mode is attenuated compared to the second example.

Figure 21:
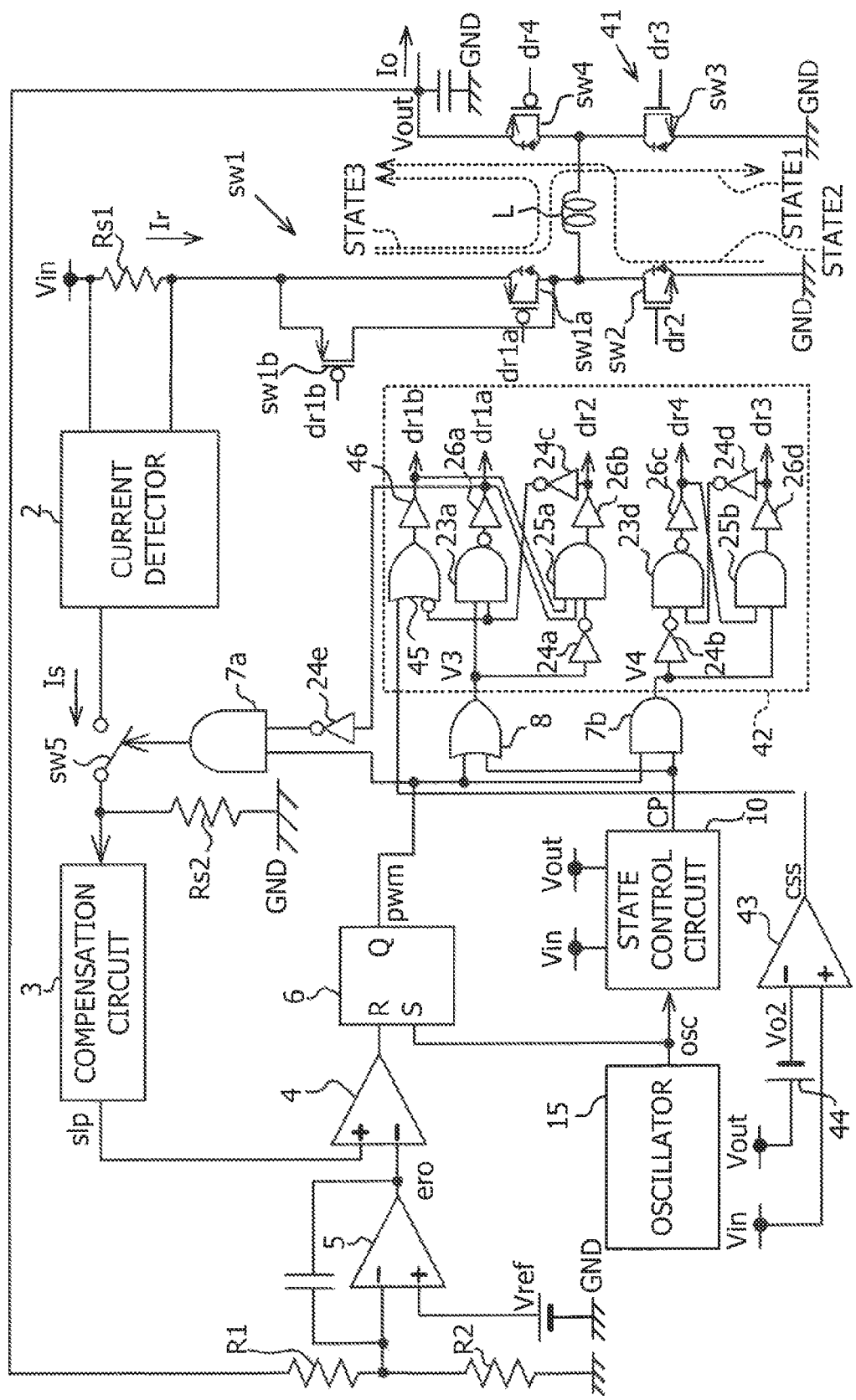
FIG. 21 illustrates a step-down-step-up DC/DC converter according to a fourth embodiment.

FIG. 21 illustrates a fourth example. In this example, those components similar to those in the second example (see FIG. 9) are denoted by the similar reference numerals, and a description thereof is omitted.

An output section 41 of a DC/DC converter includes switch circuits sw1 to sw4 and a choke inductor L. The switch circuit sw1 includes a main switch circuit sw1a which is coupled between a resistor Rs1 and the choke inductor L and a sub switch circuit sw1b which is coupled in parallel with the main switch circuit sw1a.

The switch circuits sw1a and sw1b are, for example, P channel MOS transistors. The switch circuit sw1a is controlled by a driving signal dr1a outputted from a buffer circuit 26a of a penetration prevention circuit 42, like the switch circuit sw1 according to the above-described second embodiment. The switch circuit sw1b is controlled by a driving signal dr1b outputted from the penetration prevention circuit 42.

The penetration prevention circuit 42 generates the driving signal dr1a and driving signals dr2 to dr4 based on output signals from an OR circuit 8 and an AND circuit 7a, like the penetration prevention circuit 22 according to the second embodiment. That is, the driving signal dr1a is substantially equal to the driving signal dr1 of to the second example. Accordingly, the switch circuit sw1a is switching-controlled based on the driving signal dr1a in the step-down mode and is fixed to ON in the step-up mode.

The penetration prevention circuit 42 also generates the driving signal dr1b based on the output signal from the OR circuit 8 and an output signal from a comparator 43.

An input voltage Vin is inputted to a plus-side input terminal of the comparator 43. A minus-side input terminal of the comparator 43 is coupled to an offset circuit 44. An output voltage Vout is inputted to the offset circuit 44.

The offset circuit 44 is, for example, a DC voltage source. The output voltage Vout is inputted to a plus-side terminal of the DC voltage source, and a minus-side terminal is coupled to the comparator 43. The offset circuit 44 generates a voltage Vo2 obtained by reducing the output voltage Vout by a predetermined offset voltage Voff.

The comparator 43 compares the voltage Vo2 with the input voltage Vin and outputs a control signal css corresponding to a comparison result. In this example, the comparator 43 outputs the control signal css at L level when the voltage Vo2 (=Vout−Voff) is higher than the input voltage Vin and outputs the control signal css at H level when the voltage Vo2 (=Vout−Voff) is lower than the input voltage Vin.

The control signal css is inputted to an OR circuit 45 of the penetration prevention circuit 42. The driving signal dr2 is inputted to the OR circuit 45 through an inverter circuit 24c. An output signal from the OR circuit 45 is outputted as the driving signal dr1b through a buffer circuit 46, and the driving signal dr1b is supplied to the switch circuit sw1b. The driving signal dr1b is also inputted to an AND circuit 25a.

An output signal v3 from the OR circuit 8 is inputted to the AND circuit 25a through an inverter circuit 24a, and the driving signal dr1a is also inputted. An output signal from the AND circuit 25a is outputted as the driving signal dr2 through a buffer circuit 26b.

The voltage Vo2 inputted to the above-described comparator 43 is a voltage lower than the output voltage Vout by the offset voltage Voff. Accordingly, comparison in the comparator 43 is equivalent to comparison of a voltage (=Vin+Voff) obtained by adding the offset voltage Voff to the input voltage Vin with the output voltage Vout.

The offset voltage Voff is set according to the control timing for the switch circuit sw1b, which is on/off controlled based on the control signal css.

For example, assume that the offset voltage Voff is 0 volt (V). The comparator 43 compares the input voltage Vin with the output voltage Vout and outputs the control signal css at a level corresponding to a comparison result. As described above, the step-down-step-up DC/DC converter operates in the step-down mode when the input voltage Vin is higher than the output voltage Vout and operates in the step-up mode when the input voltage Vin is lower than the output voltage Vout. Accordingly, the comparator 43 outputs the control signal css at L level when the step-down-step-up DC/DC converter operates in the step-up mode and outputs the control signal css at H level when the step-down-step-up DC/DC converter operates in the step-down mode.

When the control signal css is at H level, the OR circuit 45 outputs a signal at H level, and the buffer circuit 46 outputs the driving signal dr1b at H level. Accordingly, when the DC/DC converter operates in the step-down mode, the switch circuit sw1b is fixed to OFF.

On the other hand, when the control signal css is at L level, the OR circuit 45 outputs a signal with a signal level obtained by logically inverting an output signal from the inverter circuit 24c, i.e., a level substantially equal to the level of the driving signal dr2. The output signal from the OR circuit 45 is outputted as the driving signal dr1b through the buffer circuit 46.

When the input voltage Vin is lower than the output voltage Vout, i.e., in the step-up mode, the driving signal dr2 at L level is outputted, and the switch circuit sw2 is fixed to OFF. Accordingly, in the step-up mode, the driving signal dr1b at L level is outputted, and the switch circuit sw1b is fixed to ON.

That is, the switch circuit sw1b is turned on or off according to the differential voltage between the input voltage Vin and the output voltage Vout.

Accordingly, in the step-down mode, the switch circuit sw1a in the switch circuit sw1 of the output section 41 is switching-controlled, and the switch circuit sw1b is fixed to OFF. In the step-up mode, both the switch circuits sw1a and sw1b are fixed to ON.

That is, in the step-down mode, one (sw1b in this embodiment) of the switch circuits sw1a and sw1b, which are included in the switch circuit sw1 and are coupled in parallel with each other, is fixed to OFF. This reduces a switching loss in the step-down mode.

For example, when the input voltage Vin is higher than the output voltage Vout, the switch circuit sw3 is fixed to OFF, the switch circuit sw4 is fixed to ON, and the switch circuits sw1 and sw2 are switching-controlled, as illustrated in FIG. 1. With this configuration, the output section 41 performs step-down operation including alternating between state 2 and state 3. In the step-down operation, a current I2 which flows in state 2 and a current I3 which flows in state 3 are both supplied to a load. Accordingly, an output current Io, i.e., a load current to be supplied to the load has the average value of the values of the current I2 and current I3, as illustrated in FIG. 20A.

On the other hand, when the input voltage Vin is lower than the output voltage Vout, the switch circuit sw1 is fixed to ON, the switch circuit sw2 is fixed to OFF, and the switch circuits sw3 and sw4 are switching-controlled, as illustrated in FIG. 3. With this configuration, the output section 41 performs step-up operation including alternating between state 1 and state 3. In the step-up operation, the current I3, which flows in state 3, is supplied to the load, and a current I1 which flows in state 1 is not supplied to the load. Accordingly, the load current (output current Io) has the average value of the values of the current I1 and current I3, as illustrated in FIG. 20B.

Since step-up operation and step-down operation are not different in load current, a current Ix which flows through the choke inductor L at the time of step-up operation becomes larger than at the time of step-down operation. The current capacity of each of the switch circuits sw1, sw3, and sw4 is determined to allow the current Ix. In case that the switch circuits sw1 to sw4 are each composed of a transistor, the size of each transistor is determined to allow the current Ix.

At the time of step-down operation, the switch circuit sw1 coupled between an input end to which the input voltage Vin is supplied and the choke inductor L is switching-controlled. The current Ix (I2 and I3) which flows through the switch circuit sw1 at the time of step-down operation is smaller than the current Ix (I3) which flows through the switch circuit sw1 at the time of step-up operation. That is, the switch circuit sw1 of a size (transistor size) larger than certain size is driven at the time of step-down operation.

The output section 41 of the step-down-step-up DC/DC converter according to this example includes the switch circuit sw1a coupled between the input end to which the input voltage Vin is supplied and the choke inductor L and the switch circuit sw1b coupled in parallel with the switch circuit sw1a.

In the step-up mode, both the switch circuits sw1a and sw1b are fixed to ON. Accordingly, the resultant current flowing through both the switch circuits sw1a and sw1b is the current I1 (or I3), which flows in state 1 (or 3). For this reason, the sum of the sizes (transistor sizes) of both the switch circuits sw1a and sw1b is made equal to the size of the switch circuit sw1 according to any of the above-described examples (e.g., the second example).

On the other hand, in the step-down mode, the switch circuit sw1b is fixed to OFF, and the switch circuit sw1a is switched. Accordingly, a current which flows through the switch circuit sw1a is the current I3, which flows in state 3. For this reason, the size (transistor size) of the switch circuit sw1a needs to be large for the current I3 to flow in state 3 in the step-down mode. Since the current I3 which flows in state 3 in the step-down mode is smaller than the current I3 which flows in state 3 in the step-up mode, the size of the switch circuit sw1a is smaller than that of the switch circuit sw1 according to any of the above-described examples (e.g., the second example).

The size (transistor size) of a switch circuit corresponds to a voltage (current) needed to on/off control the switch circuit. That is, the amount of current needed to on/off control a large-sized switch circuit is larger than that needed to on/off control a small-sized switch circuit. Accordingly, the process of fixing the switch circuit sw1*b* to ON and on/off controlling the switch circuit sw1*a* of a size large to apply the current I3 in state 3 in the step-down mode may reduce the amount of current needed for switching, i.e., may make it possible to reduce a switching loss in the step-down mode.

The disclosed step-down-step-up DC/DC converter is shifted from the step-up mode to the step-down mode or from the step-down mode to the step-up mode in response to a change in the input voltage Vin. Accordingly, when the offset voltage Voff of the offset circuit 44 in FIG. 21 is set to 0 V, the control signal css at a level corresponding to the magnitude relation between the input voltage Vin and the output voltage Vout is outputted from the comparator 43, and the switch circuit sw1*b* is on/off controlled by the control signal css. For this reason, when the differential voltage between the input voltage Vin and the output voltage Vout is close to 0 V, a current for driving the switch circuit sw1*b* is needed.

When the offset voltage Voff higher than 0 V is set in the offset circuit 44, when the differential voltage between the input voltage Vin and the output voltage Vout is not less than the offset voltage Voff, the comparator 43 outputs the control signal css at H level, and the switch circuit sw1*b* is turned off by the control signal css at H level. That is, when the offset voltage Voff is set, and when the mode is shifted in response to a change in the input voltage Vin, switching of the switch circuit sw1*b* may be controlled.

Note that the disclosed step-down-step-up DC/DC converter performs control operations to minimize a time t1 for state 1 in the step-up mode and performs control operations to minimize a time t2 for state 2 in the step-down mode. Accordingly, when the differential voltage between the input voltage Vin and the output voltage Vout is close to 0 V, the current I3 which flows in state 3 in the step-up mode becomes almost equal to the current I3 which flows in state 3 in the step-down mode.

For this reason, when the differential voltage between the input voltage Vin and the output voltage Vout is close to 0 V, the current I3 in state 3 may be made to flow by the switch circuit sw1*a* fixed to ON even when the switch circuit sw1*b* is fixed to OFF. This may make it possible to inhibit a loss caused by switching of the switch circuit sw1*b* from increasing.

The step-down-step-up DC/DC converter with the above-described configuration may attain the effects below in addition to the working effects attained by the second example.

(1) The switch circuit sw1 is configured to include the switch circuit sw1*a* coupled between the input end to which the input voltage Vin is supplied and the choke inductor L, and the switch circuit sw1*b* coupled in parallel with the switch circuit sw1*a*. The switch circuit sw1*a* is fixed to ON in the step-up mode and is switched in the step-down mode. The switch circuit sw1*b* is fixed to ON or OFF depending on the differential voltage between the input voltage Vin and the output voltage Vout. As a result, a switching loss in the step-down mode may be reduced by switching-controlling the switch circuit sw1*a* in the step-down mode.

(2) The offset voltage Voff is set with respect to the input voltage Vin and output voltage Vout inputted to the comparator 43. Even in the step-up mode, when the differential voltage between the input voltage Vin and the output voltage Vout is smaller than the offset voltage Voff, the switch circuit sw1*b* is fixed to OFF. As a result, it may be possible to suppress switching of the switch circuit sw1*b* and inhibit a loss caused by switching of the switch circuit sw1*b* from increasing.

Figure 22:
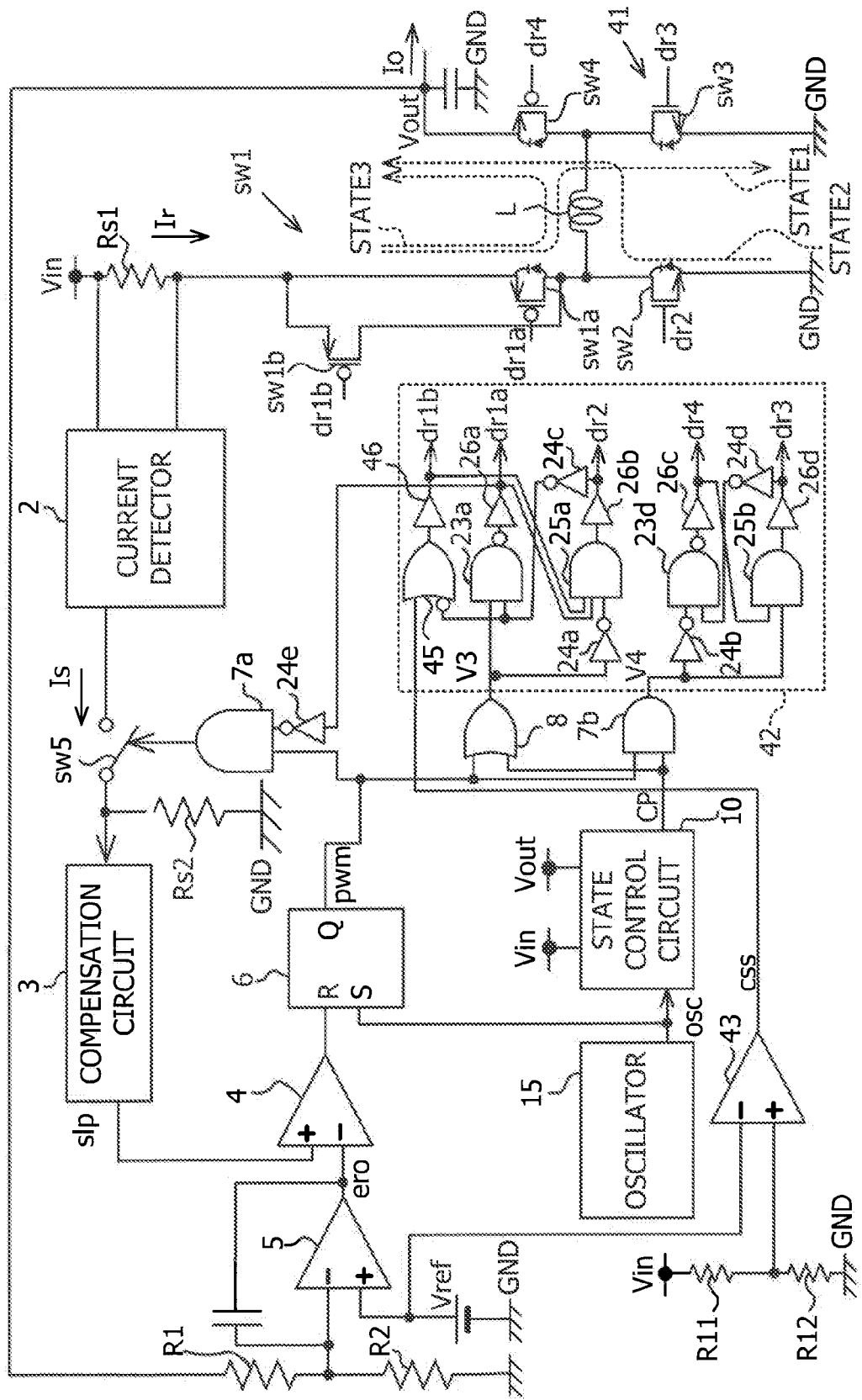
FIG. 22 illustrates another step-down-step-up DC/DC converter of the fourth embodiment in FIG. 21.

Note that the DC/DC converter illustrated in FIG. 21 is configured such that the input voltage Vin is directly supplied to the comparator 43. However, the input voltage Vin may be divided by resistors R11 and R12, and a divided voltage may be supplied to a plus-side input terminal of the comparator 43, as illustrated in FIG. 22. A reference voltage Vref is inputted to a minus-side input terminal of the comparator 43.

The reference voltage Vref is a target voltage for stabilizing the output voltage Vout. The error amplifier 5 controls the switch circuits sw1 to sw4 such that a voltage obtained by dividing the output voltage Vout by resistors R1 and R2 coincides with the reference voltage Vref.

That is, the reference voltage Vref is a voltage proportional to the output voltage Vout and is more stable than the output voltage Vout. It may be thus possible to generate a voltage proportional to the input voltage Vin by the resistors R11 and R12 and fix the switch circuit sw1*b* to ON or OFF depending on the differential voltage between the voltage and the reference voltage Vref.

Since, in this circuit example, the above-described offset voltage Voff may be set by adjusting the ratio between the resistance values of the resistor R11 and resistor R12, which generate the divided voltage, the offset circuit 44 may be omitted.

Figure 23:
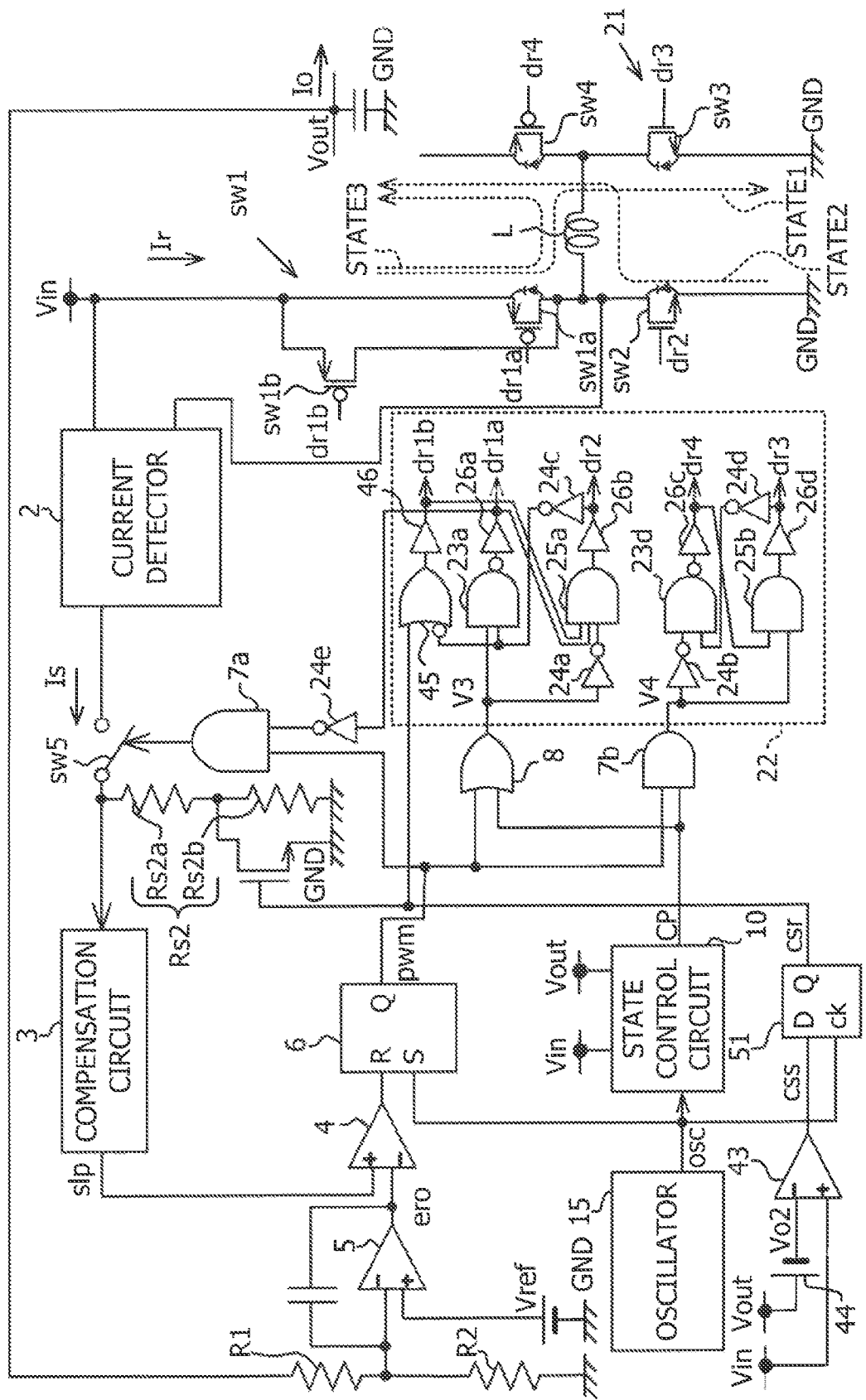
FIG. 23 illustrates a step-down-step-up DC/DC converter according to a fifth embodiment.

FIG. 23 illustrates a fifth example. In this example, similar components as those in the fourth example (see FIG. 21) are denoted by the similar reference numerals, and a description thereof is omitted.

A current detector 2 according to this embodiment is coupled to two ends of a switch circuit sw1. The switch circuit sw1 includes a switch circuit sw1*a* coupled between an input end to which an input voltage Vin is supplied and a choke inductor L, and a switch circuit sw1*b* coupled in parallel with the switch circuit sw1*a*.

When the switch circuit sw1 is turned on, a potential difference is generated by a current Ir which flows through the switch circuit sw1 and the on-resistance of the switch circuit sw1. The current detector 2 detects the current Ir (inductor current), which flows through the switch circuit sw1, based on the potential difference between two terminals of the switch circuit sw1 and outputs a sense current Is proportional to the current Ir.

An output terminal of the current detector 2 is coupled to a resistor Rs2 through a switch circuit sw5. A node between the switch circuit sw5 and the resistor Rs2 is coupled to an input terminal of a compensation circuit 3.

The resistor Rs2 includes resistors Rs2*a* and Rs2*b* series-coupled to each other. A first terminal of the resistor Rs2*a* is coupled to the switch circuit sw5 and compensation circuit 3, a second terminal of the resistor Rs2*a* is coupled to a first terminal of the resistor Rs2*b*, and a second terminal of the resistor Rs2*b* is coupled to a ground GND.

When the switch circuit sw5 is turned on, a potential difference proportional to the sense current Is is generated between the terminals of the resistor Rs2. The potential difference is proportional to the current Ir, which flows through the switch circuit sw1. The voltage at the first terminal of the resistor Rs2, i.e., a voltage proportional to the current Ir, which flows through the switch circuit sw1, is supplied to the input terminal of the compensation circuit 3.

A switch circuit sw6 is coupled in parallel with the resistor Rs2*b*. The switch circuit sw6 is, for example, an N channel MOS transistor. A control signal csr outputted from a flip-flop circuit 51 is inputted to the switch circuit sw6.

A control signal css outputted from a comparator 43 is inputted to an input terminal D of the flip-flop circuit 51, and an oscillation signal osc with a constant period outputted from an oscillator 15 is inputted to a clock terminal ck. The oscillation signal osc is outputted as a pulse signal which becomes H level with a constant period, as illustrated in FIG. 5.

The flip-flop circuit 51 latches the control signal css in response to the oscillation signal osc at H level and outputs the control signal csr at a level equal to the latch level. The period of the oscillation signal osc is the switching period of an output section 41. Accordingly, the flip-flop circuit 51 changes the level of the control signal csr in synchronism with the switching period. The control signal csr is inputted to the switch circuit sw6. The switch circuit sw6 is turned on or off in response to the control signal csr.

The oscillation signal osc is inputted to a set terminal S of a flip-flop circuit 6. The flip-flop circuit 6 outputs an output signal pwm at H level in response to the oscillation signal osc at H level. A driving signal dr1a for switching the switch circuit sw1a is generated based on the output signal pwm. The switch circuit sw5 is controlled based on the output signal pwm and driving signal dr1a.

Accordingly, the control signal csr is changed with the similar timing as the timing of rising of the output signal pwm. For this reason, when the switch circuit sw5 is turned on by the output signal pwm and driving signal dr1a, the switch circuit sw6 is turned on or off. The on/off state of the switch circuit sw6 is controlled with the switching period.

The switch circuit sw6, which is on, short-circuits the terminals of the resistor Rs2b. At this time, the resistance value of the resistor Rs2 becomes equal to the resistance value of the resistor Rs2a. When the switch circuit sw6 is turned off, the resistance value of the resistor Rs2 becomes equal to the sum of the resistance values of the resistors Rs2a and Rs2b series-coupled to each other. That is, the switch circuit sw6 (adjustment circuit) adjusts the resistance value of the sense resistor Rs2.

The control signal csr is inputted to an OR circuit 45. An output signal from the OR circuit 45 is outputted as a driving signal dr1b through a buffer circuit 46. The switch circuit sw1b of the output section 41 is turned on or off in response to the driving signal dr1b. Accordingly, the switch circuit sw1b is fixed to ON or OFF in synchronism with the switching period.

The switch circuit sw1 includes the switch circuits sw1a and sw1b coupled in parallel with each other, and the switch circuit sw1b is fixed to ON or OFF depending on the differential voltage between the input voltage Vin and an output voltage Vout. Accordingly, the resistance value between the terminals of the switch circuit sw1 varies according to control of the switch circuit sw1b, i.e., depending on the differential voltage between the input voltage Vin and the output voltage Vout. Upon a change in the resistance value, the current value of the sense current Is outputted from the current detector 2 changes.

When the resistance value of the resistor Rs2 is changed in response to a change in the sense current Is, a change in the voltage at the node between the switch circuit sw5 and the resistor Rs2, i.e., a sense voltage Vs inputted to the compensation circuit 3 may be suppressed. That is, the resistance values of the resistors Rs2a and Rs2b included in the resistor Rs2 are set according to the sense current Is outputted from the current detector 2 when the switch circuit sw1b is turned on and the sense current Is outputted from the current detector 2 when the switch circuit sw1b is turned off.

For example, assume that the on-resistance values of the switch circuits sw1a and sw1b are similar. In this case, letting Is0 be the sense current Is when the switch circuit sw1b is turned on, the sense current Is when the switch circuit sw1b is turned off is twice the current Is0. Accordingly, the resistance value of the resistor Rs2 when the switch circuit sw1b is turned off is made ½ that of the resistor Rs2 when the switch circuit sw1b is turned on. That is, the resistor Rs2a and resistor Rs2b are made to have similar resistance values, the switch circuit sw6 is turned off when the switch circuit sw1b is turned on, and the switch circuit sw6 is turned on when the switch circuit sw1b is turned off. In this case, a voltage equal to the voltage Vs when the switch circuit sw1b is turned on may also be obtained when the switch circuit sw1b is turned off.

The step-down-step-up DC/DC converter with the above-described configuration may attain the effects below in addition to the working effects attained by the fourth example.

(1) The current Ir which flows through the switch circuit sw1 may be detected from the on-resistance of the switch circuit sw1 by the current detector 2, and the resistor Rs1 may be omitted.

(2) The on-resistance value of the switch circuit sw1 varies depending on the on/off state of the switch circuit sw1b included in the switch circuit sw1. Since the resistance value of the resistor Rs2, through which the sense current Is outputted from the current detector 2 flows, is made to vary depending on the on/off state of the switch circuit sw1, a variation in the voltage Vs, which is determined by the sense current Is and resistor Rs2 and is inputted to the compensation circuit 3, may be suppressed.

(3) The flip-flop circuit 51 latches the control signal css in accordance with a signal (the oscillation signal osc in this embodiment) corresponding to the switching period and outputs the control signal csr. In response to the control signal csr, the switch circuit sw1b of the output section 41 and the switch circuit sw6, which changes the resistance value of the resistor Rs2, are on/off controlled. The on/off control prevents the switch circuits sw1b and sw6 from being turned on or off during the switching period. This may make it possible to prevent the voltage Vs inputted to the compensation circuit 3 from being contaminated by noise caused by turn-on and turn-off of the switch circuits sw1b and sw6. It may be also possible to suppress a variation in the voltage Vs due to the difference between the timing of controlling the switch circuit sw1b and the timing of controlling the switch circuit sw6.

Figure 24:
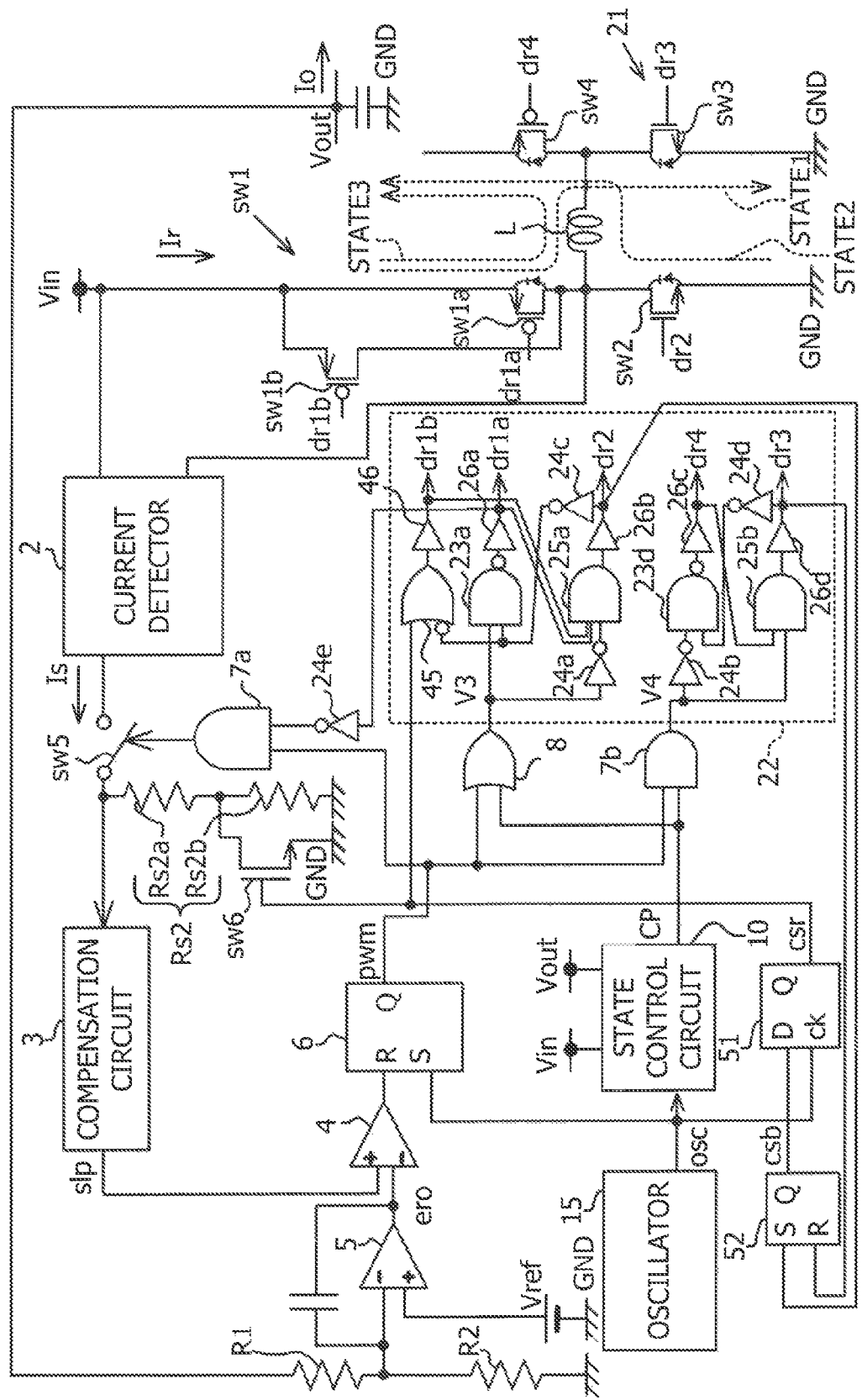
FIG. 24 illustrates a step-down-step-up DC/DC converter according to a sixth embodiment.

FIG. 24 illustrates a sixth example. In this example, similar components as those in the fifth example (see FIG. 23) are denoted by similar reference numerals, and a description thereof will be omitted.

A driving signal dr2 generated by a penetration prevention circuit 42 is inputted to a set terminal S of a flip-flop circuit 52. A driving signal dr3 generated by the penetration prevention circuit 42 is inputted to a reset terminal R of the flip-flop circuit 52. The flip-flop circuit 52 outputs a control signal csb based on the driving signals dr2 and dr3. The control signal csb is inputted to an input terminal D of a flip-flop circuit 51.

The driving signal dr2 is a signal for controlling a switch circuit sw2. The switch circuit sw2 is fixed to OFF in the step-up mode and is switching-controlled in the step-down mode. That is, the penetration prevention circuit 42 outputs the driving signal dr2 at L level in the step-down mode to fix the switch circuit sw2 to OFF and outputs the driving signal dr2 with a pulse waveform in the step-up mode to switching-control the switch circuit sw2.

The driving signal dr3 is a signal for controlling a switch circuit sw3. The switch circuit sw3 is fixed to OFF in the step-down mode and is switching-controlled in the step-up mode. That is, the penetration prevention circuit 42 outputs the driving signal dr3 at L level in the step-up mode to fix the switch circuit sw3 to OFF and outputs the driving signal dr3 with a pulse waveform in the step-down mode to switching-control the switch circuit sw3.

Accordingly, whether the operating mode is the step-up mode or the step-down mode may be determined from the driving signal dr2 and driving signal dr3. That is, the flip-flop circuit 52 outputs the control signal csb at H level in response to the driving signal dr2 at H level inputted to the reset terminal R and outputs the control signal csb at L level in response to the driving signal dr3 at H level inputted to the reset terminal R.

The flip-flop circuit 51 latches the control signal csb in response to an oscillation signal osc at H level and outputs a control signal csr at a level equal to the latch level. A switch circuit sw1b and a switch circuit sw6 are on/off controlled based on the control signal csr.

The step-down-step-up DC/DC converter with the above-described configuration is capable of determining the operating mode by the flip-flop circuit 52 and controlling the switch circuits sw1b and sw6 according to a determination result, in addition to the working effects attained by the fifth embodiment.

The above-described examples may also be implemented in the manners below.

Although the switch circuits sw1 to sw4 are each composed of a MOS transistor, another switch element may be used.

Note that the formulae used in the above description are ideal formulae, and behavior represented by each formula may be different from actual behavior.

The configurations of the DC/DC converters according to the above-described fourth to sixth examples may be applied to other DC/DC converters (e.g., the DC/DC converters according to the first and third examples).

Figure 8:
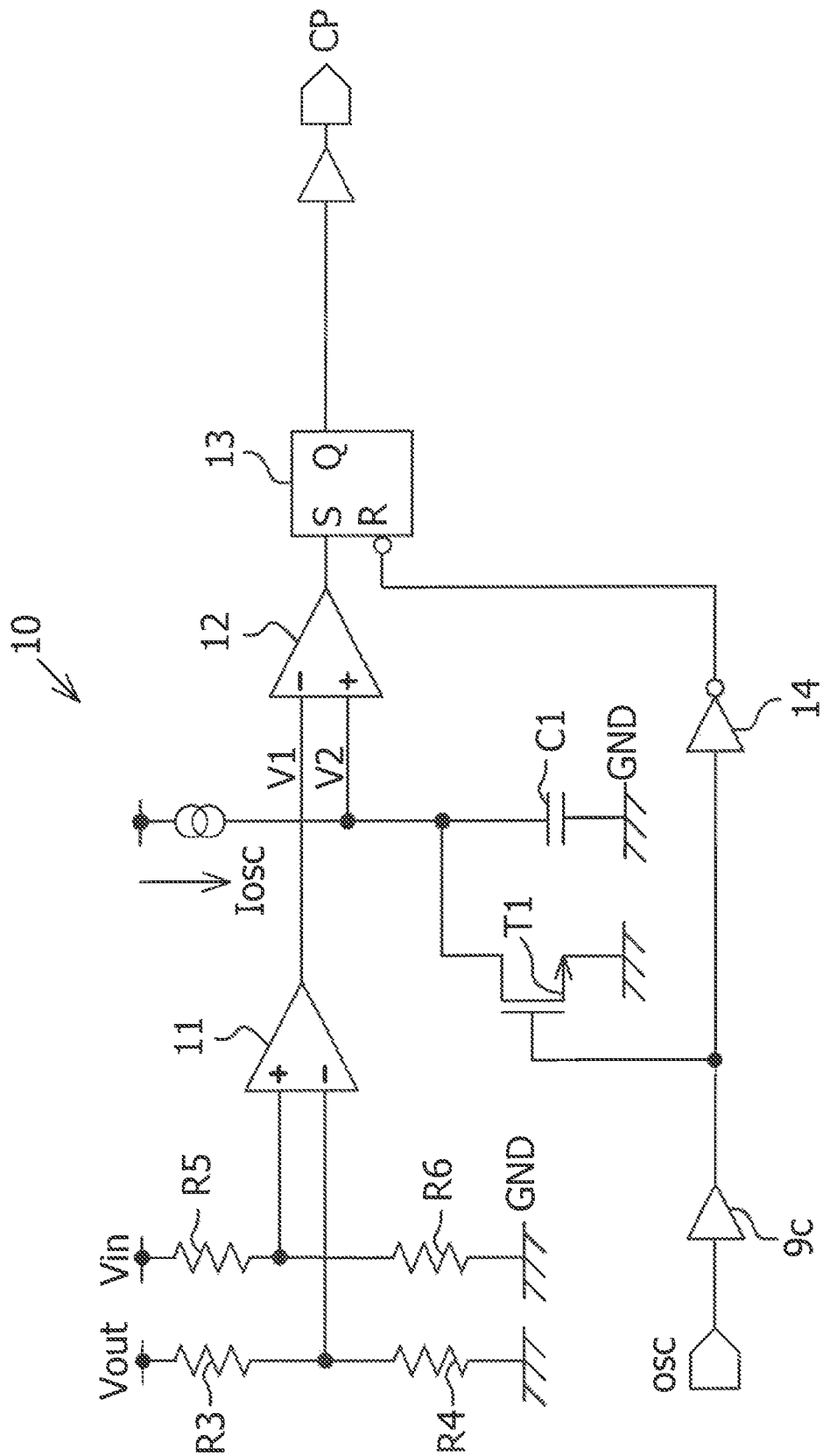
FIG. 8 illustrates a state controller of the first embodiment in FIG. 4.

In the fourth and fifth examples, the state controller 10 may be configured to supply a voltage obtained by dividing the input voltage Vin by resistors and a voltage obtained by dividing the output voltage Vout by resistors to the comparator 43, like the state controller 10 illustrated in FIG. 8.

For example, a variable resistor may be used as the resistor Rs2 according to each of the fifth and sixth examples, and the resistance value may be changed.

The numerical designations associated with the examples (first, second or third etc.) do not show priorities of the examples. Many variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the example of the present invention has been described in detail, it should be understood that the various changes, substitutions, and alterations could be made hereto without departing from the spirit and scope of the invention, the scope of which is defined in the claims and their equivalents.

What is claimed is:

1. An output voltage controller, comprising:
a first controller configured to control a current supply to an inductor based on an output voltage received by the first controller; and
a second controller configured to control the current supply by controlling, based on an input voltage, a period when an input end, the inductor and an output end are coupled, wherein the second controller comprises a delay circuit;
wherein the input voltage is inputted at the input end; and
wherein the output voltage is outputted at the output end.

2. The output voltage controller of claim 1,
wherein the first controller generates an output signal; and
wherein the second controller generates a first adjustment signal, a second adjustment signal and a control signal.

3. The output voltage controller of claim 2, further comprising:
a logic circuit configured to generate a driving signal for controlling the current supply based on the output signal and the first adjustment signal, the second adjustment signal and the control signal; and
a switch circuit configured to control the current supply based on the driving signal.

4. The output voltage controller of claim 3,
wherein the switch circuit comprises a first switch that couples a first end of the inductor to the input end, a second switch that couples the first end to a ground end, a third switch that couples a second end of the inductor to the output end and a fourth switch that couples the second end to the ground end.

5. The output voltage controller of claim 3,
wherein the delay circuit introduces a lag between a rising edge of the control signal and a rising edge of each of the first adjustment signal and the second adjustment signal.

6. The output voltage controller of claim 5,
wherein a second switch turns off at a time according to duration of lag between the rising edge of the control signal and the rising edge of the first adjustment signal.

7. The output voltage controller of claim 5,
wherein a fourth switch turns off at a time according to duration of lag between the rising edge of the control signal and the rising edge of the second adjustment signal.

8. The output voltage controller of claim 4,
wherein the logic circuit comprises a penetration prevention circuit configured to prevent the first switch and the second switch, or the third switch and the fourth switch, from being simultaneously turned on to prevent a penetration current to flow in the switch circuit, and further configured to set a time for preventing the penetration current from being generated in the switch circuit.

9. The output voltage controller of claim 2, further comprising:
a current detector configured to output a sense current corresponding to a potential difference between the input end and a first end of the inductor;
a resistor configured to generate a sense voltage corresponding to the sense current; and
a compensation circuit configured to add a ramp voltage to the sense voltage and further configured to generate a compensation signal, wherein the first controller generates the output signal based on the output voltage and compensation signal.

10. The output voltage controller of claim 3, further comprising:
a flip-flop circuit which uses the driving signal to determine the operating mode of the switch circuit.

11. An output voltage control method comprising:
controlling by a first controller a current supply to an inductor based on an output voltage received by the first controller; and controlling by a second controller the current supply by controlling, based on an input voltage, a period when an input end, the inductor and an output end are coupled, wherein the second controller comprises a delay circuit; wherein the input voltage is inputted at the input end; and wherein the output voltage is outputted at the output end.

12. The output voltage control method of claim 11, further comprising:
generating by the first controller an output signal; and
generating by the second controller a first adjustment signal, a second adjustment signal and a control signal.

13. The output voltage control method of claim 12, further comprising:
generating by a logic circuit a driving signal for controlling the current supply based on the output signal and the first adjustment signal, the second adjustment signal and the control signal; and
controlling by a switch circuit the current supply based on the driving signal.

14. The output voltage control method of claim 13, further comprising:
coupling by a first switch of the switch circuit a first end of the inductor to the input end;
coupling by a second switch of the switch circuit the first end to a ground end;
coupling by a third switch of the switch circuit a second end of the inductor to the output end; and
coupling by a fourth switch of the switch circuit the second end to the ground end.

15. The output voltage control method of claim 13, further comprising:
introducing by the delay circuit a lag between a rising edge of the control signal and a rising edge of each of the first adjustment signal and the second adjustment signal.

16. The output voltage control method of claim 15, further comprising:
turning off a second switch at a time according to duration of lag between the rising edge of the control signal and the rising edge of the first adjustment signal.

17. The output voltage control method of claim 15, further comprising:
turning off a fourth switch at a time according to duration of lag between the rising of the control signal and the rising edge of the second adjustment signal.

18. An output voltage controller, comprising:
an input voltage terminal configured to receive an input voltage;
an output voltage terminal configured to output an output voltage;
an inductor coupled between the input voltage terminal and the output voltage terminal;
a first controller configured to control a current supply to an inductor based on an output voltage and to generate an output signal;
a second controller comprising a delay circuit and configured to control the current supply by based on the input voltage by generating a first adjustment signal, a second adjustment signal, and a control signal; and
a logic circuit configured to generate a driving signal for controlling the current supply based on the output signal and the first adjustment signal, the second adjustment signal and the control signal.

* * * * *